(12) United States Patent
Blasco Serrano

(10) Patent No.: US 12,317,165 B2
(45) Date of Patent: May 27, 2025

(54) DETERMINING A PATH OF MOVEMENT OF A TERMINAL DEVICE

(71) Applicant: Telefonaktiebolaget LM Ericsson (publ), Stockholm (SE)

(72) Inventor: Ricardo Blasco Serrano, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 18/557,973

(22) PCT Filed: Apr. 30, 2021

(86) PCT No.: PCT/EP2021/061474
§ 371 (c)(1),
(2) Date: Oct. 30, 2023

(87) PCT Pub. No.: WO2022/228700
PCT Pub. Date: Nov. 3, 2022

(65) Prior Publication Data
US 2024/0244504 A1   Jul. 18, 2024

(51) Int. Cl.
*H04W 40/18* (2009.01)
*H04L 41/147* (2022.01)
(Continued)

(52) U.S. Cl.
CPC .......... *H04W 40/18* (2013.01); *H04L 41/147* (2013.01); *H04L 45/70* (2013.01); *H04W 4/029* (2018.02)

(58) Field of Classification Search
CPC ....... H04W 40/18; H04W 4/029; H04W 4/44; H04W 40/20; H04W 4/02; H04W 4/38
See application file for complete search history.

(56) References Cited

U.S. PATENT DOCUMENTS

2011/0313648 A1* 12/2011 Newson ............. G01C 21/3484
701/447
2013/0211706 A1*  8/2013 MacNaughtan ...... H04W 88/00
701/410

(Continued)

FOREIGN PATENT DOCUMENTS

| EP | 2488828 A1 | 8/2012 |
| WO | 2011044923 A1 | 4/2011 |

OTHER PUBLICATIONS

International Search Report and Written Opinion of the International Searching Authority mailed Jan. 24, 2022 for PCT/EP2021/061474, 13 pages.

*Primary Examiner* — David R Lazaro
(74) *Attorney, Agent, or Firm* — Sage Patent Group

(57) ABSTRACT

Provided is a computer-implemented method for determining a path of movement of a terminal device. The method includes (i) obtaining a set of measurements and/or parameters relating to the terminal device and/or a communication network in which the terminal device is operating, wherein respective measurements and/or respective parameters in the received set were obtained as the terminal device traversed a path of movement through a plurality of areas; (ii) using the obtained set to identify a plurality of candidate areas in which the terminal device may have been located as the terminal device traversed the path of movement; (iii) using the obtained set to determine respective transition metrics for pairs of the candidate areas; (iv) determining respective path metrics for a plurality of candidate paths; and (v) determining the path of movement traversed by the terminal device according to the determined path metrics.

20 Claims, 12 Drawing Sheets

(51) Int. Cl.
*H04L 45/00* (2022.01)
*H04W 4/029* (2018.01)

(56) References Cited

U.S. PATENT DOCUMENTS

| | | | | |
|---|---|---|---|---|
| 2020/0320863 A1* | 10/2020 | Lewis | ............... | G08G 1/0129 |
| 2024/0073643 A1* | 2/2024 | Renaud | ............... | H04W 4/026 |
| 2024/0085193 A1* | 3/2024 | Tisseur | ............... | G01C 21/3469 |
| 2024/0244504 A1* | 7/2024 | Blasco Serrano | .... | H04W 4/029 |

* cited by examiner

DETERMINING A PATH OF MOVEMENT OF A TERMINAL DEVICE

CROSS-REFERENCE TO RELATED APPLICATIONS

This application is a 35 U.S.C § 371 national stage application for International Application No. PCT/EP2021/061474, entitled "DETERMINING A PATH OF MOVEMENT OF A TERMINAL DEVICE", filed on Apr. 30, 2021, assigned to the assignee hereof, and expressly incorporated herein by reference.

TECHNICAL FIELD

This disclosure relates to a computer-implemented method, apparatus and a computer program product for determining a path of movement of a terminal.

BACKGROUND

The performance of a communication network can be measured in many different ways. Network performance in a communication network offering wireless access may, for example, be measured in terms of uplink or downlink throughput, latency, latency jitter, service availability or packet loss. In one or another way, network performance impacts end-user experience. However, "end user experience", or quality of service (QOS), is rather subjective and harder to quantify and measure than network performance. To monitor and maintain a desired quality of service over a communication network, specific features and functionalities need to be considered, such as bearers, flows, admission control, and congestion control. This is collectively referred to as a QoS framework, or simply "QoS".

No matter what QoS framework is used, network performance is ultimately limited by the network deployment. For this reason, network vendors and operators have traditionally improved the network by, for example, adding more equipment, or new functionalities, to ensure that the desired performance level is guaranteed always, everywhere. This has worked well for best effort services and for services with relaxed requirements (e.g. mobile broadband—MBB). Services with demanding requirements have also been successfully supported in this way in controlled scenarios (e.g., factories, hot spots). However, providing services with strict performance requirements over large areas is still a challenge in many networks (e.g. due to deployment costs). A typical use case affected by variations in network performance is vehicular communication. This is not surprising given that vehicles have high mobility.

Predictive QoS—In many cases, services are able to adapt to variations in network performance, so far as the changes can be predicted in advance. For example, remote driving, which is a typical application of vehicular communications, typically combines the transmission of a video stream in the uplink (UL) and of driving commands in the downlink (DL). Modern video codecs are able to adapt the quality of transmitted video to the available bandwidth, and the entire driving operation may be changed in some examples. That is, remote driving can be adapted in two ways:

- The speed of the vehicle may be lowered, allowing remote driving to continue with a lower-quality video feed.
- The route of the vehicle may be changed to avoid areas with temporary or permanently bad network performance.

This observation has resulted in a growing interest on predictive QoS: that is, the capacity to predict the QoS performance of the network in the future, as a complementary solution to network deployment and densification as a way to ensure QoS.

A fundamental problem of predictive QoS is to predict a QoS metric given a set of measurements (also known as features) f. For example, it may be desirable to predict a QoS metric Q that a user equipment (UE) can expect at a time t and a position x given the set of features f:

$$\hat{Q} = g(f, t, x) \qquad (1)$$

In some cases the features f may include one or both of the time t and the position x of the UE, rather than being separate from the features f.

As indicated in FIG. 1, a goal is to find a predictor function g(•) that outputs a value of $\hat{Q}$ that is as similar as possible (according to some predefined criterion) to a true value Q of the QoS metric of interest.

Machine learning (ML) is a commonly used tool for predictive QoS. There are multiple ways in which ML can be applied to predictive QoS, but for the sake of illustration, supervised learning is discussed.

In supervised learning, the predictor function g(•) is built by using a training data set that contains labelled samples. That is, each sample contains the values of the features and the true value of the metric of interest. Such a training data $\mathcal{T}$ set includes $$\mathcal{S} = \{(f_1, t_1, x_1), (f_2, t_2, x_2), \ldots, (f_i, t_i, x_i), \ldots\}, \qquad (2)$$
$$\mathcal{L} = \{Q_1, Q_2, \ldots, Q_i, \ldots\},$$

where $(f_i, t_i, x_i)$ is the i-th set of features and $Q_i$ is the corresponding QoS metric (i.e. the label). That is, the set $\mathcal{S}$ contains the features and the set $\mathcal{L}$ contains the labels. To emphasise that there is a relationship between g(•) and the training data set $\mathcal{T} = (\mathcal{S}, \mathcal{L})$, the notation $g_\mathcal{T}(•)$ may be used. With this notation, the prediction of a metric Q, at location x and time t given the measured features f can be written as:

$$\hat{Q} = g_\mathcal{T}(f, t, x) \qquad (3)$$

FIG. 2 illustrates a predictor function that is trained using a labelled database $\mathcal{S}$).

The preceding formulation of the predictor highlights the need to know the position of the UE at the time of the measurement. This is expected as different performance levels are observed in different parts of the network.

Ideally it would be possible to predict the QoS metric with arbitrary resolution in space, i.e. it would be possible to predict the QoS metric at an arbitrary spatial position or location. However, in practice this is usually not possible, e.g. because it is not possible to gather enough samples for every point in the coverage area, etc., nor necessary. Instead, many prediction algorithms work by dividing the geographical region served by the cell(s) into multiple areas.

Consider the following scenario, which is illustrated in FIG. 3. FIG. 3 shows the coverage areas of four cells 1, 2, 3, 4 in a communication network. The coverage area of each cell is shown as a hexagon for ease of illustration. The use of horizontal and vertical solid and dashed lines in cells 1, 2, 3, 4 (also referred to Cell 1, Cell 2, Cell 3 and Cell 4 respectively) is to enable the coverage area of each cell to be more easily distinguished. In FIG. 3 a grid 5 is superimposed onto these four cells 1, 2, 3, 4. The grid 5 consists of rows, labelled with the letters A-I, and columns, labelled with the numbers 0-9. Each square or area 6 in the grid 5 is therefore identified by a combination of a row label and a column label. For example, A0 is the top left area 6. Some of the areas 6 are fully located inside a single cell, for example area E1 is fully located inside Cell 1, whereas others are shared between two or more cells, for example area D3 is at the border between Cell 1 and Cell 2.

Predictive QoS can operate at an area level, which means that the resolution in space of the predicted QOS metric would correspond to the size of the areas 6. Consequently, in forming the training data set and/or predicting the QoS metric, it is sufficient to know the area 6 in which the UE is located at the time the features or measurements were collected.

As discussed above, the goal of predictive QoS is to predict the QoS performance that a UE will experience at a future time t in position x using the features f. It is noted that the features (used for training or later for prediction) may be collected by the UE, by another UE, by a network (NW) node, etc., or by a combination of them. It is also noted that prediction can typically be performed by a NW node or function or by a service or application running on a server (e.g. on the cloud). This choice simplifies the application of ML for predictive QoS.

Positioning in communication networks—Wireless communications have long been used to determine the position of UEs and other nodes. This includes cellular networks as well as other technologies such as a Global Navigation Satellite System (GNSS). One way or another, all positioning techniques rely on using received signals to determine the position of a node.

Cellular networks not only provide means for determining the position of UEs but also make use of position information for multiple tasks. For example, position information may be used by the base station for scheduling different users, for radio resource management (e.g., handover, etc.).

In general, most of the research on positioning deals with improving the accuracy and availability of positioning services. That is, going from metre accuracy to decimeter accuracy and then to centimetre accuracy, or having global coverage, coverage in 'urban canyons', coverage in indoor areas, etc.

There currently exist certain challenges. Predictive QoS often relies on having positioning information available as part of the features used for building the predictive model. Without that positioning information, it may not be possible to train a model, or at least not be possible to do it with good spatial accuracy. Many predictive QoS algorithms discard or ignore training samples for which some piece of data is missing. Positioning information may not be available for several reasons. One reason is that the measurement may not have been performed by the UE, but instead by some network node which does not have information about the position of the UE. Another reason is that the UE may not be able to determine its position, for example it may not have coverage from a GNSS, etc. Another reason is that even if the UE is aware of its position, this information may not be available to the node or server performing the QoS metric prediction, for example because it is not reported by the UE, etc.

SUMMARY

Thus, there is a need for techniques that can determine a path of movement of a terminal device (e.g. a UE) through a region covered or served by a communication network. A path of movement determined using such techniques can be used to provide, for example, information on an area in which the terminal device was located when a particular measurement was made or obtained. Other uses of the determined path of movement are also contemplated.

Certain aspects of the disclosure and their embodiments may provide solutions to these or other challenges.

According to a first aspect disclosed herein, there is provided a computer-implemented method for determining a path of movement of a terminal device. The method comprises (i) obtaining a set of measurements and/or parameters relating to the terminal device and/or a communication network in which the terminal device is operating, wherein respective measurements and/or respective parameters in the received set were obtained as the terminal device traversed a path of movement through a plurality of areas; (ii) using the obtained set of measurements and/or parameters to identify a plurality of candidate areas in which the terminal device may have been located as the terminal device traversed the path of movement, wherein one or more of the plurality of candidate areas has an associated area metric indicating a likelihood that the terminal device was in the candidate area as the terminal device traversed the path of movement; (iii) using the obtained set of measurements and/or parameters to determine respective transition metrics for pairs of the candidate areas, wherein a transition metric for a pair of candidate areas indicates a likelihood that the terminal device moved from a first candidate area in the pair to the other candidate area in the pair; (iv) determining respective path metrics for a plurality of candidate paths, wherein a candidate path comprises a series of the candidate areas, and wherein the path metric for a candidate path is formed from a combination of the area metrics and transition metrics for the candidate areas in the candidate path; and (v) determining the path of movement traversed by the terminal device according to the determined path metrics.

According to a second aspect, there is provided a computer program product comprising a computer readable medium having computer readable code embodied therein. The computer readable code is configured such that, on execution by a suitable computer or processor, the computer or processor is caused to perform the method according to the first aspect or any embodiment thereof.

According to a third aspect, there is provided an apparatus for determining a path of movement of a terminal device. The apparatus is configured to (i) obtain a set of measurements and/or parameters relating to the terminal device and/or a communication network in which the terminal device is operating, wherein respective measurements and/or or respective parameters in the received set were obtained as the terminal device traversed a path of movement through a plurality of areas; (ii) use the obtained set of measurements and/or parameters to identify a plurality of candidate areas in which the terminal device may have been located as the terminal device traversed the path of movement, wherein one or more of the plurality of candidate areas has an associated area metric indicating a likelihood that the terminal device was in the candidate area as the terminal device traversed the path of movement; use the obtained set of measurements and/or parameters to determine respective transition metrics for pairs of the candidate areas, wherein a transition metric for a pair of candidate areas indicates a likelihood that the terminal device moved from a first candidate area in the pair to the other candidate area in the pair; determine respective path metrics for a plurality of candidate paths, wherein a candidate path comprises a series of the candidate areas, and wherein the path metric for a candidate path is formed from a combination of the area metrics and transition metrics for the candidate areas in the candidate path; and (v) determine the path of movement traversed by the terminal device according to the determined path metrics.

According to a fourth aspect, there is provided an apparatus for determining a path of movement of a terminal device. The apparatus comprises a processor and a memory. The memory contains instructions executable by said processor whereby the apparatus is operative to: (i) obtain a set of measurements and/or parameters relating to the terminal device and/or a communication network in which the terminal device is operating, wherein respective measurements and/or respective parameters in the received set were obtained as the terminal device traversed a path of movement through a plurality of areas; (ii) use the obtained set of measurements and/or parameters to identify a plurality of candidate areas in which the terminal device may have been located as the terminal device traversed the path of movement, wherein one or more of the plurality of candidate areas has an associated area metric indicating a likelihood that the terminal device was in the candidate area as the terminal device traversed the path of movement; use the obtained set of measurements and/or parameters to determine respective transition metrics for pairs of the candidate areas, wherein a transition metric for a pair of candidate areas indicates a likelihood that the terminal device moved from a first candidate area in the pair to the other candidate area in the pair; determine respective path metrics for a plurality of candidate paths, wherein a candidate path comprises a series of the candidate areas, and wherein the path metric for a candidate path is formed from a combination of the area metrics and transition metrics for the candidate areas in the candidate path; and (v) determine the path of movement traversed by the terminal device according to the determined path metrics.

Certain embodiments may provide one or more of the following technical advantage(s). The determined path of movement provides coarse position information about the location of a terminal device over time. The determined path of movement includes or can provide information about the location of the terminal device at the time a particular measurement was performed or obtained. While the accuracy of the position/location information may be relatively poor (e.g. tens of metres, depending on the size of the areas), for some applications this can be sufficient, for example for predictive QoS, and in particular for training a predictive QoS model.

Thus, embodiments of the techniques allow for the (coarse) position of a terminal device to be determined over time using measurements/reports that are typically transmitted to the network (e.g. including signal quality measurements such as Reference Signal Received Power (RSRP), Received Signal Strength Indicator (RSSI), etc.) and/or parameters and/or information that is available at the network (e.g. a serving cell identity (ID), etc.). In this way, the techniques allow for positioning information to be acquired even if positioning features or functions are not deployed or available at the time, for example due to a lack of GNSS coverage for the terminal device, etc., or that, even if available to the terminal device, may not be directly available to a network node (e.g. the network may not have access to the GNSS position information available at the terminal device).

The described techniques enable the path of movement to be determined, and optionally the path or specific position(s) on the path to be shared (for example to a network node or server performing a QoS prediction), without requiring any new interfaces between the terminal device and the network and a server, or new interfaces between network nodes/servers.

BRIEF DESCRIPTION OF DRAWINGS

Examples of the proposed technology will now be described in more detail and with reference to the accompanying drawings of which.

DETAILED DESCRIPTION

This detailed description provides specific details of concepts for the purpose of explanation but not limitation. It will be appreciated by one skilled in the art that variations in the examples described may be employed, apart from these specifically described. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g. analogue and/or discrete logic gates interconnected to perform a specialised function, application-specific integrated circuits (ASICs), programmable logic array's (PLAs), etc.) and/or using computer programs and data in conjunction with one or more digital microprocessors or general purpose computers that are specially arranged and configured to carry out the processing disclosed herein. Nodes that communicate wirelessly may include radio communications circuitry compliant with a relevant short range or mobile communications radio standard. Moreover, the technology described herein may be considered to be embodied entirely within any form of computer-readable memory, such as solid-state memory, magnetic disk, or optical disk containing an appropriate set of computer instructions that would cause a processor to carry out the methods and functions described herein.

Hardware implementations may include or encompass, without limitation, digital signal processor (DSP) hardware, a reduced instruction set processor, hardware (e.g. digital or analogue) circuitry including but not limited to application specific integrated circuit(s) (ASIC) and/or field programmable gate array(s) (FPGA(s)), and (where appropriate) state machines capable of performing such functions.

In terms of computer implementations, a computer is generally understood to comprise one or more processors, one or more processing modules or one or more controllers, and the terms computer, processor, processing module and controller may be employed interchangeably. When provided by a computer, processor, or controller, the functions described herein may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 4:
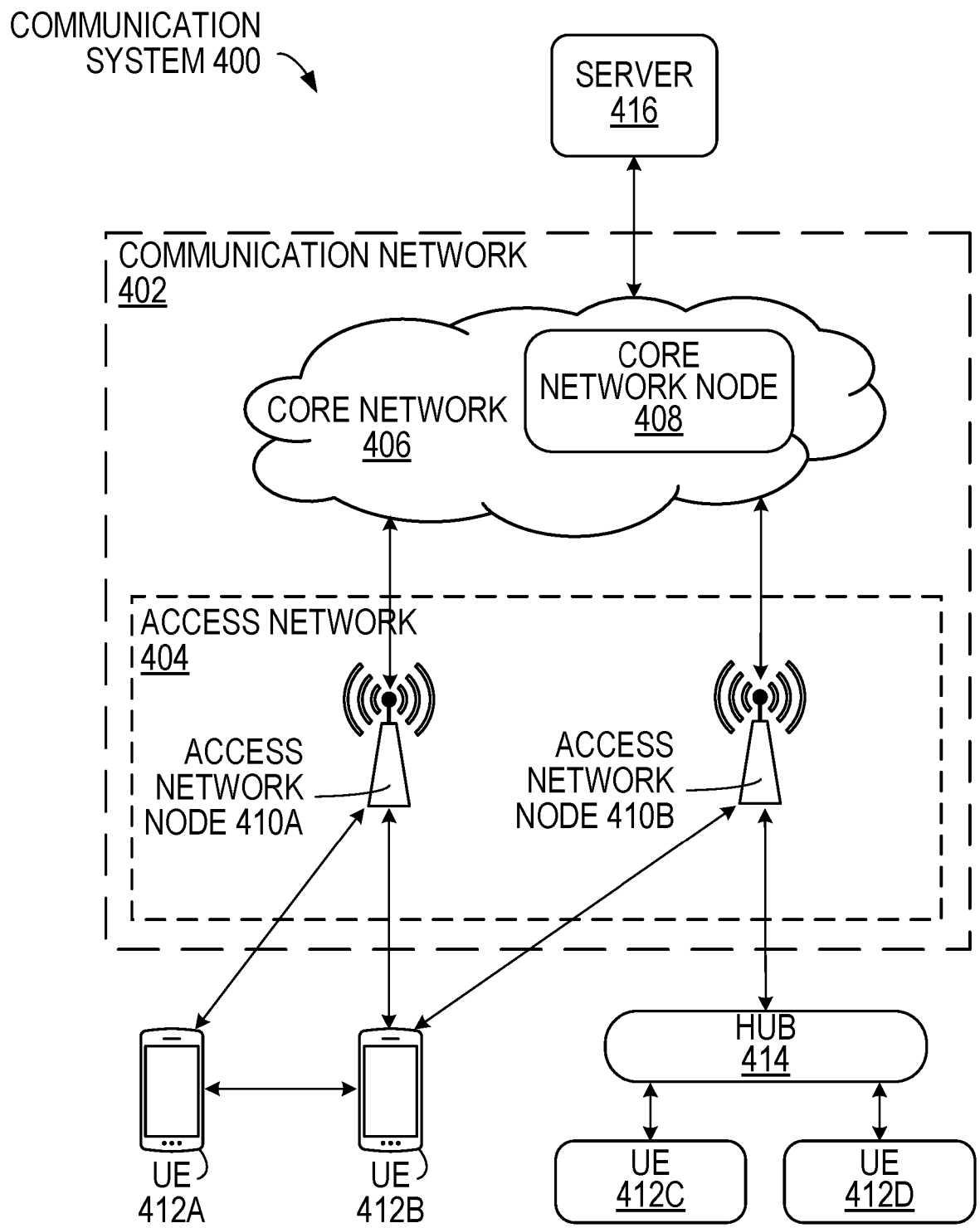
FIG. 4 is an example of a communication system.

FIG. 4 shows an example of a communication system 400 to which the techniques described herein can be applied. In the example, the communication system 400 includes a communication network 402 that includes an access network 404, such as a radio access network (RAN), and a core network 406, which includes one or more core network nodes 408. The access network 404 includes one or more access network nodes, such as access network nodes 410a and 410b (one or more of which may be generally referred to as access network nodes 410), or any other similar $3^{rd}$ Generation Partnership Project (3GPP) access node or non-3GPP access point. The access network nodes 410 facilitate direct or indirect connection of user equipment (UE), such as by connecting UEs 412a, 412b, 412c, and 412d (one or more of which may be generally referred to as UEs 412) to the core network 406 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 400 may include any number of wired or wireless networks, network nodes, UEs, and/or any other components or systems that may facilitate or participate in the communication of data and/or signals whether via wired or wireless connections. The communication system 400 may include and/or interface with any type of communication, telecommunication, data, cellular, radio network, and/or other similar type of system.

The UEs 412 may be any of a wide variety of communication devices, including wireless devices arranged, configured, and/or operable to communicate wirelessly with the access network nodes 410 and other communication devices. Similarly, the access network nodes 410 are arranged, capable, configured, and/or operable to communicate directly or indirectly with the UEs 412 and/or with other network nodes or equipment in the communication network 402 to enable and/or provide network access, such as wireless network 25 access, and/or to perform other functions, such as administration in the communication network 402.

In the depicted example, the core network 406 connects the access network nodes 410 to one or more servers, such as server 416. These connections may be direct or indirect via one or more intermediary networks or devices. In other examples, access network nodes may be directly coupled to server(s). The core network 406 includes one more core network nodes (e.g. core network node 408) that are structured with hardware and software components. Features of these components may be substantially similar to those described with respect to the UEs, access network nodes, and/or servers, such that the descriptions thereof are generally applicable to the corresponding components of the core network node 408. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), a Network Data Analytics Function (NWDAF), a User Plane Function (UPF), and/or other types of Network Function (NF).

The server 416 may be under the ownership or control of a service provider other than an operator or provider of the access network 404 and/or the communication network 402, and may be operated by the service provider or on behalf of the service provider. The server 416 may host a variety of applications to provide one or more services. Examples of such applications can include an application for: determining a path of movement of the UE according to the techniques described herein, forming and/or using a training data set including location information obtained from the determined path of movement for training a predictive QoS model, predicting a QoS metric for the UE using location information obtained from the determined path of movement, the provision of live and/or pre-recorded audio/video content, data collection services, for example, retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 400 of FIG. 4 enables connectivity between the UEs, network nodes, and servers. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave. Near Field Communication (NFC) ZigBee, LiFi, and/or any low-power widearea network (LPWAN) standards such as LoRa and Sigfox.

In some examples, the communication network 402 is a cellular network that implements 3GPP standardized features. Accordingly, the communication network 402 may support network slicing to provide different logical networks to different devices that are connected to the communication network 402. For example, the communication network 402 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 412 are configured to transmit and/or receive information without direct human interaction. For instance, a UE may be designed to transmit information to the access network 404 on a predetermined schedule, when triggered by an internal or external event, or in response to requests from the access network 404. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio—Dual Connectivity (EN-DC).

In the example illustrated in FIG. 4, the hub 414 communicates with the access network 404 to facilitate indirect communication between one or more UEs (e.g., UE 412c and/or 412d) and access network nodes (e.g., access network node 410b). In some examples, the hub 414 may be a controller, router, a content source and analytics node, or any of the other communication devices described herein regarding UEs. For example, the hub 414 may be a broadband router enabling access to the core network 406 for the UEs. As another example, the hub 414 may be a controller that sends commands or instructions to one or more actuators in the UEs. Commands or instructions may be received from the UEs, access network nodes 410, or by executable code, script, process, or other instructions in the hub 414. As another example, the hub 414 may be a data collector that acts as temporary storage for UE data and, in some embodiments, may perform analysis or other processing of the data. As another example, the hub 414 may be a content source. For example, for a UE that is a VR headset, display, loudspeaker or other media delivery device, the hub 414 may retrieve VR assets, video, audio, or other media or data related to sensory information via a network node, which the hub 414 then provides to the UE either directly, after performing local processing, and/or after adding additional local content. In still another example, the hub 414 acts as a proxy server or orchestrator for the UEs, in particular in if one or more of the UEs are low energy IoT devices.

The hub 414 may have a constant/persistent or intermittent connection to the access network node 410b. The hub 414 may also allow for a different communication scheme and/or schedule between the hub 414 and UEs (e.g., UE 412c and/or 412d), and between the hub 414 and the core network 406. In other examples, the hub 414 is connected to the core network 406 and/or one or more UEs via a wired connection. Moreover, the hub 414 may be configured to connect to a machine-to-machine (M2M) service provider over the access network 404 and/or to another UE over a direct connection. In some scenarios, UEs may establish a wireless connection with the access network nodes 410 while still connected via the hub 414 via a wired or wireless connection. In some embodiments, the hub 414 may be a dedicated hub—that is, a hub whose primary function is to route communications to/from the UEs from/to the access network node 410b. In other embodiments, the hub 414 may be a non-dedicated hub—that is, a device which is capable of operating to route communications between the UEs and access network node 410b, but which is additionally capable of operating as a communication start and/or end point for certain data channels.

Figure 5:
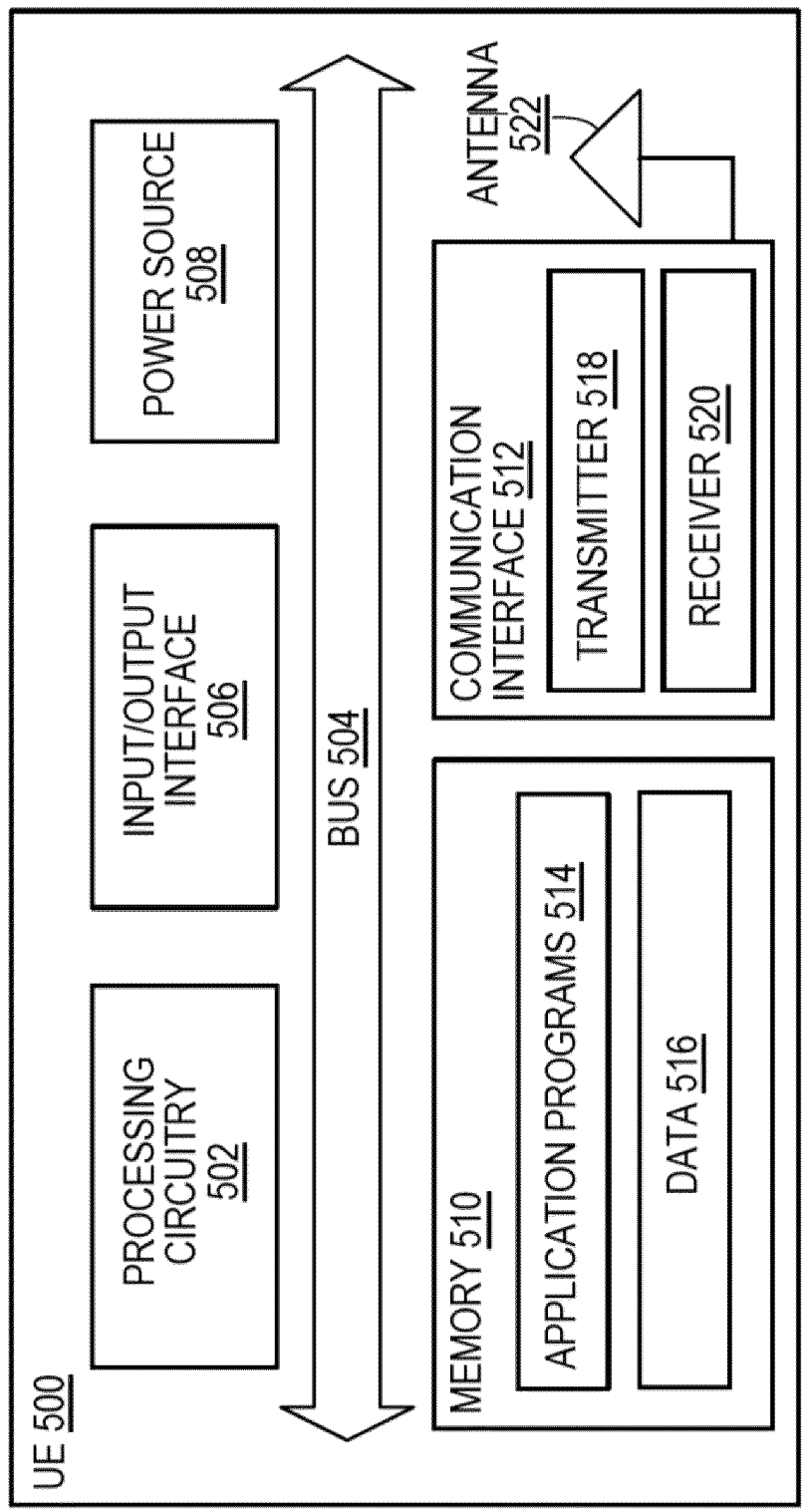
FIG. 5 is an example of a UE in accordance with some embodiments.

FIG. 5 shows a UE 500 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless camera, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE. A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 500 includes processing circuitry 502 that is operatively coupled via a bus 504 to an input/output interface 506, a power source 508, a memory 510, a communication interface 512, and/or any other component, or any combination thereof. Certain UEs may utilize all or a subset of the components shown in FIG. 5. The level of integration between the components may vary from one UE to another UE. Further, certain UEs may contain multiple instances of a component, such as multiple processors, memories, transceivers, transmitters, receivers, etc. The processing circuitry 502 is configured to process instructions and data and may be configured to implement any sequential state machine operative to execute instructions stored as machine-readable computer programs in the memory 510. The processing circuitry 502 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 502 may include multiple central processing units (CPUs). The processing circuitry 502 may be operable to provide, either alone or in conjunction with other UE 500 components, such as the memory 510, to provide UE 500 functionality. For example, the processing circuitry 502 may be configured to cause the UE 502 to perform the methods of determining a path of movement of the UE, forming and/or using a training data set including location information obtained from the determined path of movement for training a predictive QoS model, or predicting a QoS metric for the UE using location information obtained from the determined path of movement.

In the example, the input/output interface 506 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 500. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 508 is structured as a battery or battery pack. Other types of power sources, such as an external power source (e.g., an electricity outlet), photovoltaic device, or power cell, may be used. The power source 508 may further include power circuitry for delivering power from the power source 508 itself, and/or an external power source, to the various parts of the UE 500 via input circuitry or an interface such as an electrical power cable. Delivering power may be, for example, for charging of the power source 508. Power circuitry may perform any formatting, converting, or other modification to the power from the power source 508 to make the power suitable for the respective components of the UE 500 to which power is supplied.

The memory 510 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 510 includes one or more application programs 514, such as an operating system, web browser application, a widget, gadget engine, or other application, and corresponding data 516. The memory 510 may store, for use by the UE 500, any of a variety of various operating systems or combinations of operating systems.

The memory 510 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card'. The memory 510 may allow the UE 500 to access instructions, application programs and the like, stored on transitory or non-transitory memory media, to off-load data, or to upload data. An article of manufacture, such as one utilizing a communication system may be tangibly embodied as or in the memory 510, which may be or comprise a device-readable storage medium.

The processing circuitry 502 may be configured to communicate with an access network or other network using the communication interface 512. The communication interface 512 may comprise one or more communication subsystems and may include or be communicatively coupled to an antenna 522. The communication interface 512 may include one or more transceivers used to communicate, such as by communicating with one or more remote transceivers of another device capable of wireless communication (e.g., another UE or a network node in an access network). Each transceiver may include a transmitter 518 and/or a receiver 520 appropriate to provide network communications (e.g., optical, electrical, frequency allocations, and so forth). Moreover, the transmitter 518 and receiver 520 may be coupled to one or more antennas (e.g., antenna 522) and may share circuit components, software or firmware, or alternatively be implemented separately.

In some embodiments, communication functions of the communication interface 512 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 512, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or controls a robotic arm performing a medical procedure according to the received input.

A UE, when in the form of an Internet of Things (IOT) device, may be a device for use in one or more application domains, these domains comprising, but not limited to, city wearable technology, extended industrial application and healthcare. Non-limiting examples of such an IoT device are devices which are or which are embedded in: a robot vacuum cleaner, an autonomous vehicle, a vehicle parking monitoring device, a smart watch, a fitness tracker, a head-mounted display for Augmented Reality (AR) or Virtual Reality (VR), a wearable for tactile augmentation or sensory enhancement, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence on the intended application of the IoT device in addition to other components as described in relation to the UE 500 shown in FIG. 5.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IOT standard. In other scenarios, a UE may represent a vehicle, such as a car, a bus, a truck, a ship and an airplane, or other equipment that is capable of monitoring and/or reporting on its operational status or other functions associated with its operation.

Figure 6:
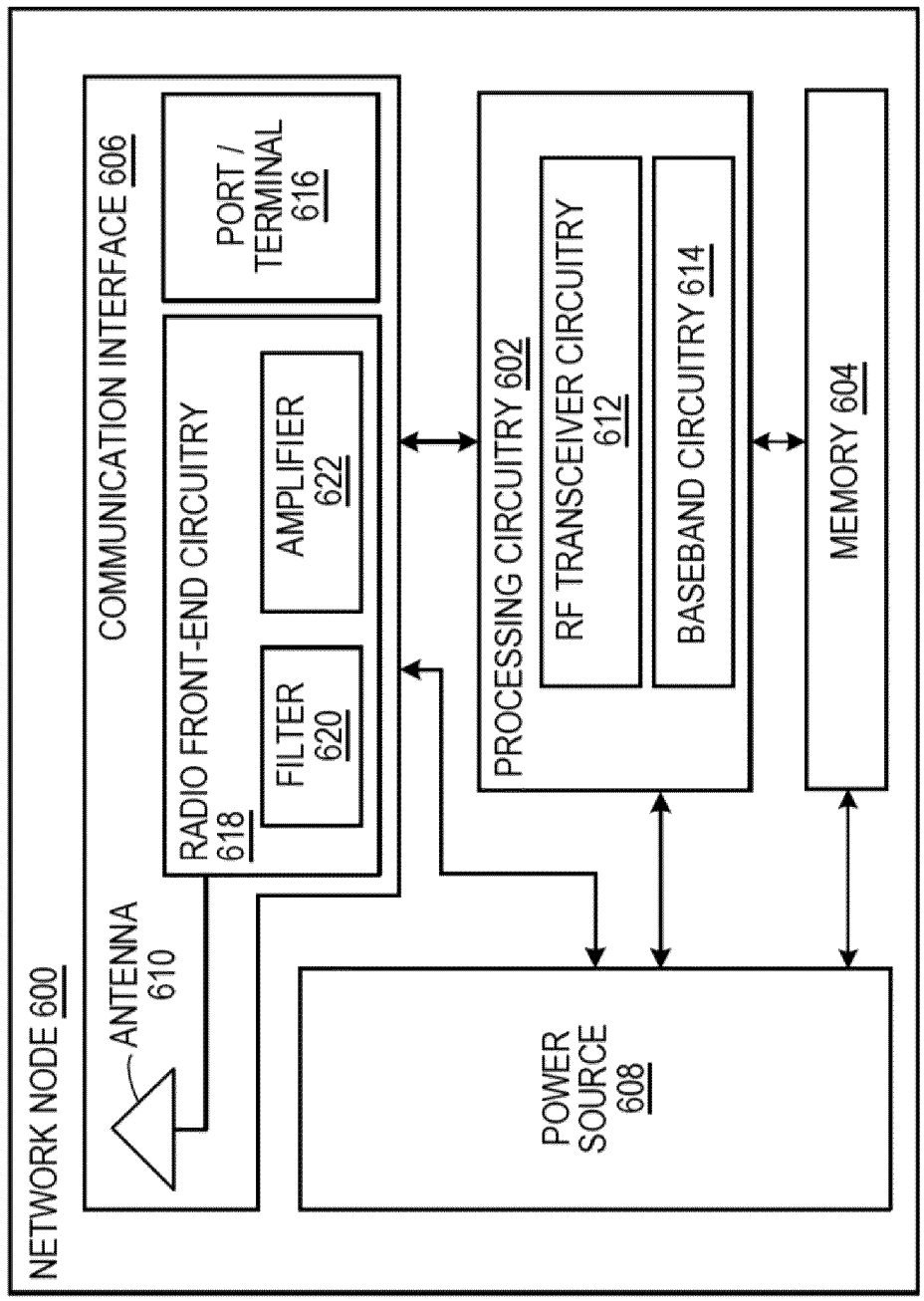
FIG. 6 is an example of a network node in accordance with some embodiments.

FIG. 6 shows a network node 600 in accordance with some embodiments. As used herein, network node refers to equipment capable, configured, arranged and/or operable to communicate directly or indirectly with a UE and/or with other network nodes or equipment, in a communication network. The network node 600 may be an access network node 410 in the access network 404, and examples of access network nodes include, but are not limited to, access points (APs) (e.g., radio access points), base stations (BSs) (e.g., radio base stations, Node Bs, evolved Node Bs (eNodeBs or eNBs) and NR NodeBs (gNodeBs or gNBs)). Alternatively, the network node 600 may be a core network node 408 in the core network 406. Example core network nodes include a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), a Network Data Analytics Function (NWDAF), a User Plane Function (UPF), or other type of network function (NF).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), Operation and Maintenance (O & M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 600 includes processing circuitry 602, a memory 604, a communication interface 606, and a power source 608, and/or any other component, or any combination thereof. The network node 600 may be composed of multiple physically separate components (e.g., a NodeB component and a RNC component, or a BTS component and a BSC component, etc.), which may each have their own respective components. In certain scenarios in which the network node 600 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 600 may be configured to support multiple radio access technologies (RATs). In such embodiments, some components may be duplicated (e.g., separate memory 604 for different RATs) and some components may be reused (e.g., a same antenna 610 may be shared by different RATs). The network node 600 may also include multiple sets of the various illustrated components for different wireless technologies integrated into network node 600, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 600.

The processing circuitry 602 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 600 components, such as the memory 604, to provide network node 600 functionality. For example, the processing circuitry 602 may be configured to cause the network node to perform the methods of determining a path of movement of the UE, forming and/or using a training data set including location information obtained from the determined path of movement for training a predictive QoS model, or predicting a QoS metric for the UE using location information obtained from the determined path of movement.

In some embodiments, the processing circuitry 602 includes a system on a chip (SOC). In some embodiments, the processing circuitry 602 includes one or more of radio frequency (RF) transceiver circuitry 612 and baseband processing circuitry 614. In some embodiments, the radio frequency (RF) transceiver circuitry 612 and the baseband processing circuitry 614 may be on separate chips (or sets of chips), boards, or units, such as radio units and digital units. In alternative embodiments, part or all of RF transceiver circuitry 612 and baseband processing circuitry 614 may be on the same chip or set of chips, boards, or units.

The memory 604 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 602. The memory 604 may store any suitable instructions, data, or information, including a computer program, software, an application including one or more of logic, rules, code, tables, and/or other instructions capable of being executed by the processing circuitry 602 and utilized by the network node 600. The memory 604 may be used to store any calculations made by the processing circuitry 602 and/or any data received via the communication interface 606. In some embodiments, the processing circuitry 602 and memory 604 is integrated.

The communication interface 606 is used in wired or wireless communication of signalling and/or data between a network node, access network, and/or UE. As illustrated, the communication interface 606 comprises port(s)/terminal(s) 616 to send and receive data, for example to and from a network over a wired connection. The communication interface 606 also includes radio front-end circuitry 618 that may be coupled to, or in certain embodiments a part of, the antenna 610. Radio front-end circuitry 618 comprises filters 620 and amplifiers 622. The radio front-end circuitry 618 may be connected to an antenna 610 and processing circuitry 602. The radio front-end circuitry may be configured to condition signals communicated between antenna 610 and processing circuitry 602. The radio front-end circuitry 618 may receive digital data that is to be sent out to other network nodes or UEs via a wireless connection. The radio front-end circuitry 618 may convert the digital data into a radio signal having the appropriate channel and bandwidth parameters using a combination of filters 620 and/or amplifiers 622. The radio signal may then be transmitted via the antenna 610. Similarly, when receiving data, the antenna 610 may collect radio signals which are then converted into digital data by the radio front-end circuitry 618. The digital data may be passed to the processing circuitry 602. In other embodiments, the communication interface may comprise different components and/or different combinations of components.

In certain alternative embodiments, the network node 600 does not include separate radio front-end circuitry 618, instead, the processing circuitry 602 includes radio front-end circuitry and is connected to the antenna 610. Similarly, in some embodiments, all or some of the RF transceiver circuitry 612 is part of the communication interface 606. In still other embodiments, the communication interface 606 includes one or more ports or terminals 616, the radio front-end circuitry 618, and the RF transceiver circuitry 612, as part of a radio unit 20) (not shown), and the communication interface 606 communicates with the baseband processing circuitry 614, which is part of a digital unit (not shown).

The antenna 610 may include one or more antennas, or antenna arrays, configured to send and/or receive wireless signals. The antenna 610 may be coupled to the radio front-end circuitry 618 and may be any type of antenna capable of transmitting and receiving data and/or signals wirelessly. In certain embodiments, the antenna 610 is separate from the network node 600 and connectable to the network node 600 through an interface or port.

The antenna 610, communication interface 606, and/or the processing circuitry 602 may be configured to perform any receiving operations and/or certain obtaining operations described herein as being performed by the network node. Any information, data and/or signals may be received from a UE, another network node and/or any other network equipment. Similarly, the antenna 610, the communication interface 606, and/or the processing circuitry 602 may be configured to perform any transmitting operations described herein as being performed by the network node. Any information, data and/or signals may be transmitted to a UE, another network node and/or any other network equipment.

The power source 608 provides power to the various components of network node 600 in a form suitable for the respective components (e.g., at a voltage and current level needed for each respective component). The power source 608 may further comprise, or be coupled to, power management circuitry to supply the components of the network node 600 with power for performing the functionality described herein. For example, the network node 600 may be connectable to an external power source (e.g., the power grid, an electricity outlet) via an input circuitry or interface such as an electrical cable, whereby the external power source supplies power to power circuitry of the power source 608. As a further example, the power source 608 may comprise a source of power in the form of a battery or battery pack which is connected to, or integrated in, power circuitry. The battery may provide backup power should the external power source fail.

Embodiments of the network node 600 may include additional components beyond those shown in FIG. 6 for providing certain aspects of the network node's functionality, including any of the functionality described herein and/or any functionality necessary to support the subject matter described herein. For example, the network node 600 may include user interface equipment to allow input of information into the network node 600 and to allow output of information from the network node 600. This may allow a user to perform diagnostic, maintenance, repair, and other administrative functions for the network node 600.

Figure 7:
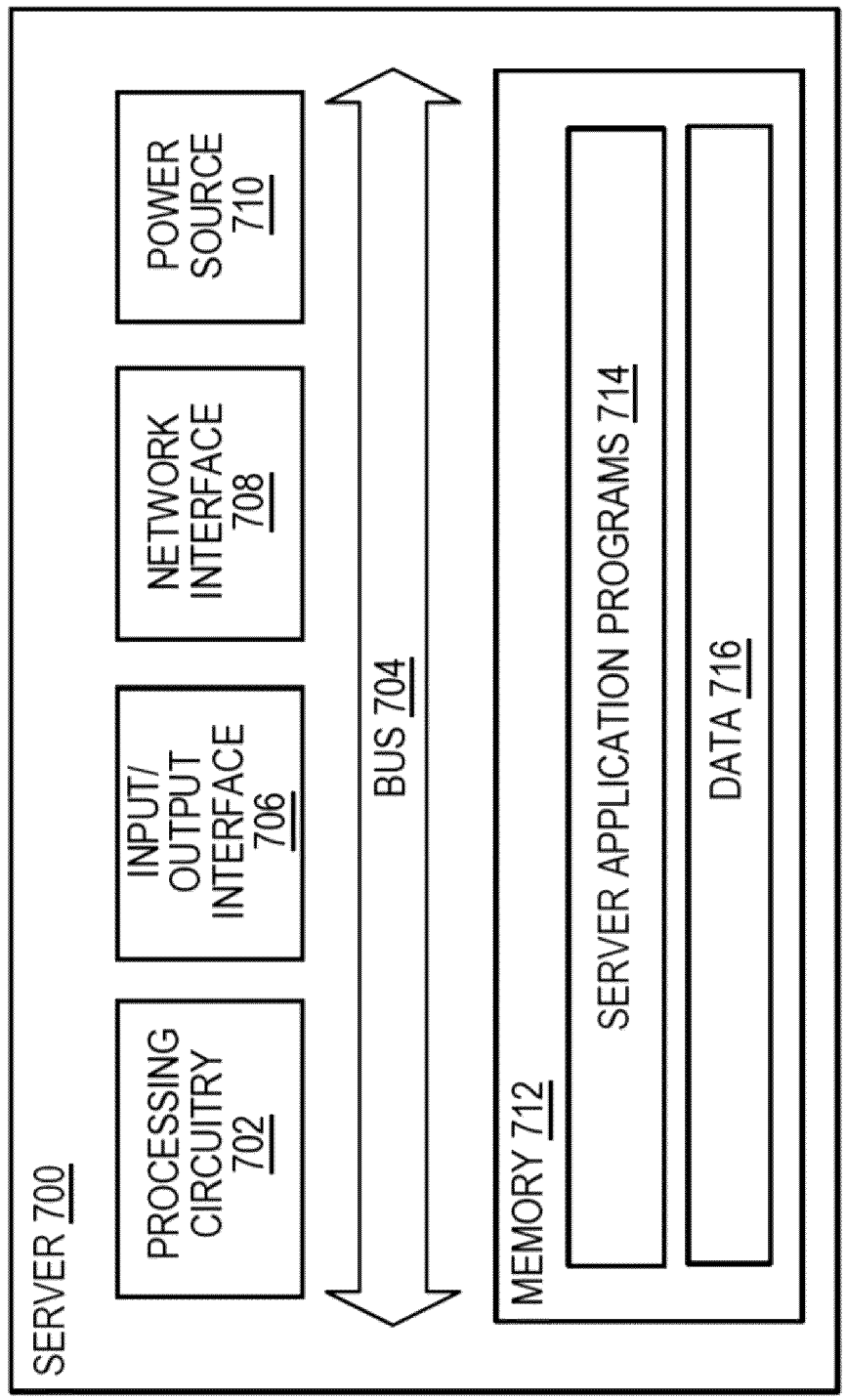
FIG. 7 is an example of a server in accordance with some embodiments.

FIG. 7 is a block diagram of a server 700, which may be an embodiment of the server 416 of FIG. 4, in accordance with various aspects described herein. As used herein, the server 700 may be or comprise various combinations hardware and/or software, including a standalone server, a blade server, a cloud-implemented server, a distributed server, a virtual machine, container, or processing resources in a server farm. The server 700 may provide one or more services to one or more UEs.

The server 700 includes processing circuitry 702 that is operatively coupled via a bus 704 to an input/output interface 706, a network interface 708, a power source 710, and a memory 712. Other components may be included in other embodiments. Features of these components may be substantially similar to those described with respect to the devices of previous figures, such as FIGS. 5 and 6, such that the descriptions thereof are generally applicable to the corresponding components of server 700.

In some embodiments, the processing circuitry 702 may be configured to cause the server 700 to perform the methods of determining a path of movement of the UE, forming and/or using a training data set including location information obtained from the determined path of movement for training a predictive QoS model, or predicting a QoS metric for the UE using location information obtained from the determined path of movement.

The memory 712 may include one or more computer programs including one or more server application programs 714 and data 716, which may include user data, e.g., data generated by a UE for the server 700 or data generated by the server 700 for a UE. Embodiments of the server 700 may utilize only a subset or all of the components shown. The server application programs 714 may be implemented in a container-based architecture and may include application programs for any of: determining a path of movement of the UE according to the techniques described herein, forming and/or using a training data set including location information obtained from the determined path of movement for training a predictive QoS model, or predicting a QoS metric for the UE using location information obtained from the determined path of movement.

Figure 8:
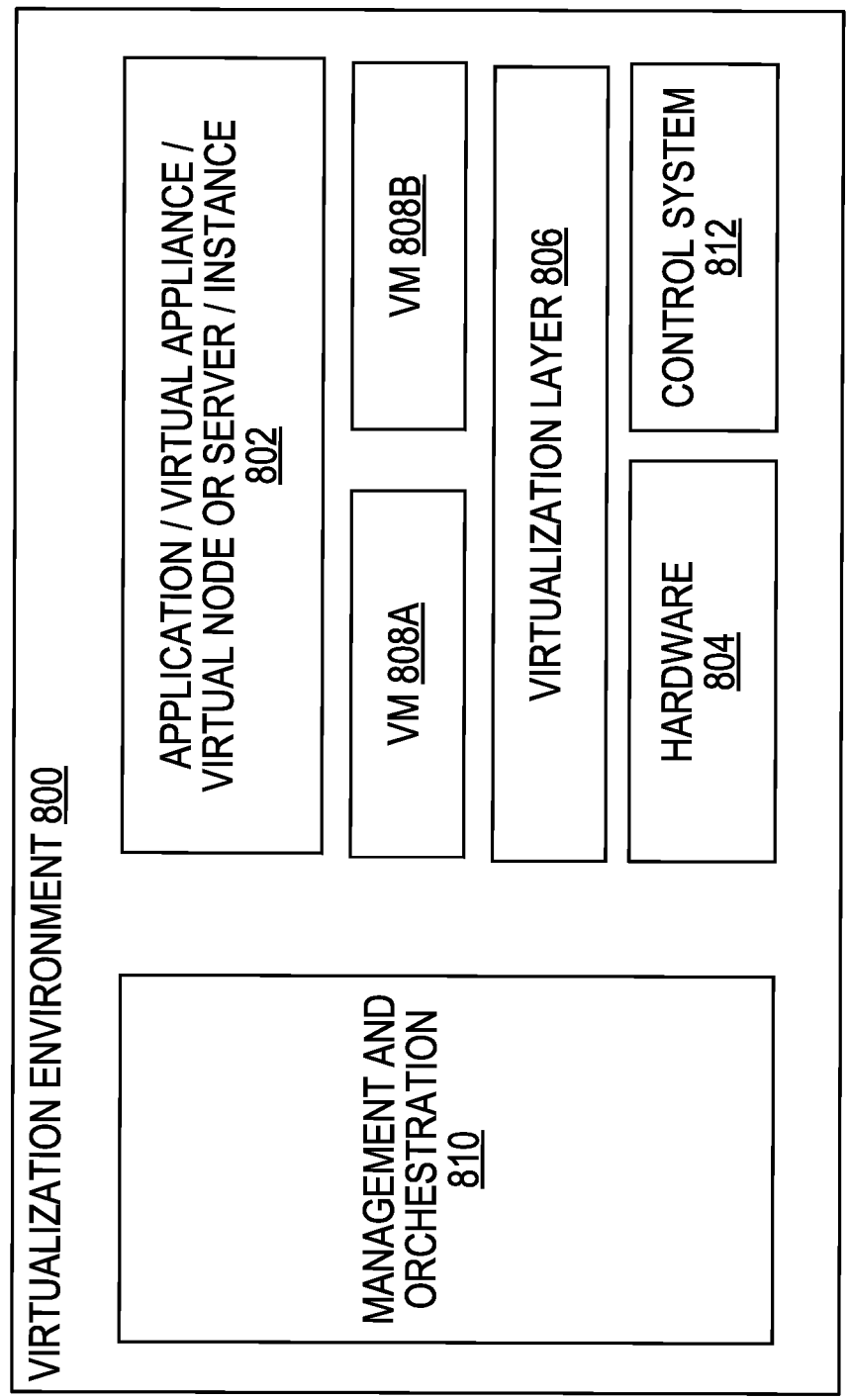
FIG. 8 is an example of a virtualization environment in accordance with some embodiments.

FIG. 8 is a block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 800 hosted by one or more hardware nodes, such as a hardware computing device that operates as a network node, UE, core network node, or server. Further, in embodiments in which the virtual node does not require radio connectivity (e.g., a core network node or server), then the node may be entirely virtualized.

Applications 802 (which may alternatively be called software instances, virtual appliances, network functions, virtual nodes, virtual network functions, etc.) are run in the virtualization environment 800 to implement some of the features, functions, and/or benefits of some of the embodiments disclosed herein.

Hardware 804 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 806 (also referred to as hypervisors or virtual machine monitors (VMMs)), provide VMs 808*a* and 808*b* (one or more of which may be generally referred to as VMs 808), and/or perform any of the functions, features and/or benefits described in relation with some embodiments described herein. The virtualization layer 806 may present a virtual operating platform that appears like networking hardware to the VMs 808.

The VMs 808 comprise virtual processing, virtual memory, virtual networking or interface and virtual storage, and may be run by a corresponding virtualization layer 806. Different embodiments of the instance of a virtual appliance 802 may be implemented on one or more of VMs 808, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 808 may be a software implementation of a physical machine that runs programs as if they were executing on a physical, non-virtualized machine. Each of the VMs 808, and that part of hardware 804 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 808 on top of the hardware 804 and corresponds to the application 802.

Hardware 804 may be implemented in a standalone network node with generic or specific components. Hardware 804 may implement some functions via virtualization. Alternatively, hardware 804 may be part of a larger cluster of hardware (e.g. such as in a data center or CPE) where many hardware nodes work together and are managed via management and orchestration 810, which, among others, oversees lifecycle management of applications 802. In some embodiments, hardware 804 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signalling can be provided with the use of a control system 812 which may alternatively be used for communication between hardware nodes and radio units.

As noted above, embodiments of the techniques described herein allow for the path of movement of a terminal device to be determined over time using collected features/measurements (e.g. radio measurements, etc.), as well as, optionally, other types of information, such as road network information, including road infrastructure information and/or, road traffic/utilisation information, etc., to assign metrics (likelihoods) to different candidate locations and candidate paths. The path with the most favourable metric can be selected as the path taken by the terminal device. In some embodiments the path or specific position(s)/location(s) of the terminal device on the path can be determined and shared, for example to a network node or server performing a QoS metric prediction or training a QoS predictive ML model.

Although it will be appreciated that the technique of determining a path of movement of a terminal device can have many different applications and uses beyond preparing data for a training data set for a predictive model, parts of the following description describe determining the path of movement of the terminal device (UE) for such a scenario where one or more measurements in a training data set for a predictive model do not include the required location information for the terminal device (UE) at the time that the measurement was made or obtained.

Briefly, a method for determining location information (also referred to as 'position information') for a UE at the time some measurements were performed comprises the following steps or operations.

Firstly, if not already partitioned, a geographical region covered by the communication network in which the UE is operating is partitioned into a plurality of areas. These areas are smaller than the coverage region of a cell, and may, for example have a size of just a few metres or tens of metres.

Next, a start area or a set of candidate start areas, and an end area or a set of candidate end areas are determined, and each candidate start area and candidate end area is assigned a respective area metric that represents the probability of the UE being in (or having been in) that area.

Next, a set of candidate intermediate areas are determined, and a metric, referred to a 'transition metric', is assigned or determined for a respective transition from a start area to a candidate intermediate area, from a candidate intermediate area to another candidate intermediate area, and from a candidate intermediate area to an end area. The transition metric represents the probability that the UE moved from one area to the other. In some embodiments, an area metric is also determined for one or more of the candidate intermediate areas.

For a candidate path of movement through a plurality of areas from a start area to an end area, some or all of the area metrics and transition metrics for the areas in the candidate path are combined to determine a path metric, representing the likelihood that the UE travelled or traversed that path.

The candidate path with the best likelihood can be selected as the path of movement of the UE (i.e. the path that the UE traversed through the region).

Subsequently, for a measurement for which some location information of the UE is not available, the location information can be obtained as the area of the selected path that the UE was in at the time of that measurement. That location information can be associated with the measurement, and the measurement with the location information can be used as part of a larger training data set to train a predictive QoS algorithm or model.

The different metrics (the area metrics and/or transition metrics) may be determined using information contained in some measurements or features (e.g. radio measurements, etc.) relating to the UE (e.g. serving cell, estimated average speed, etc.), relating to the network (e.g. coverage areas, radio propagation, etc.), and/or relating to the road or rail infrastructure (e.g. presence/absence of a road or railway, or a high/low capacity road, etc.).

In more detail, certain embodiments of this disclosure deal with the problems of assigning coarse position information/location information to one or more measurements that lack it. The positioning information is coarse in the sense that the resolution, while being well under the typical cell sizes for a macro deployment (which are of the order of hundreds or thousands of metres), is in the order of meters or tens of meters. The embodiments described infer or determine the position of a UE (or a set of positions, e.g., a path of movement) from some measurements (typically radio measurements) and/or information about the cells.

It is possible for the method to be performed by a number of different entities. In some embodiments, the method is performed by a network node 600, for example an access network node 410 (e.g. a BS such as an eNB, a gNB, etc.), or a core network node 408 (such as an NWDAF or other network function). In other embodiments, the method is performed by the server 416/700, for example by an application or service running on the server 416/700. As another alternative, the method can be performed by a UE 412/500.

Figure 2:
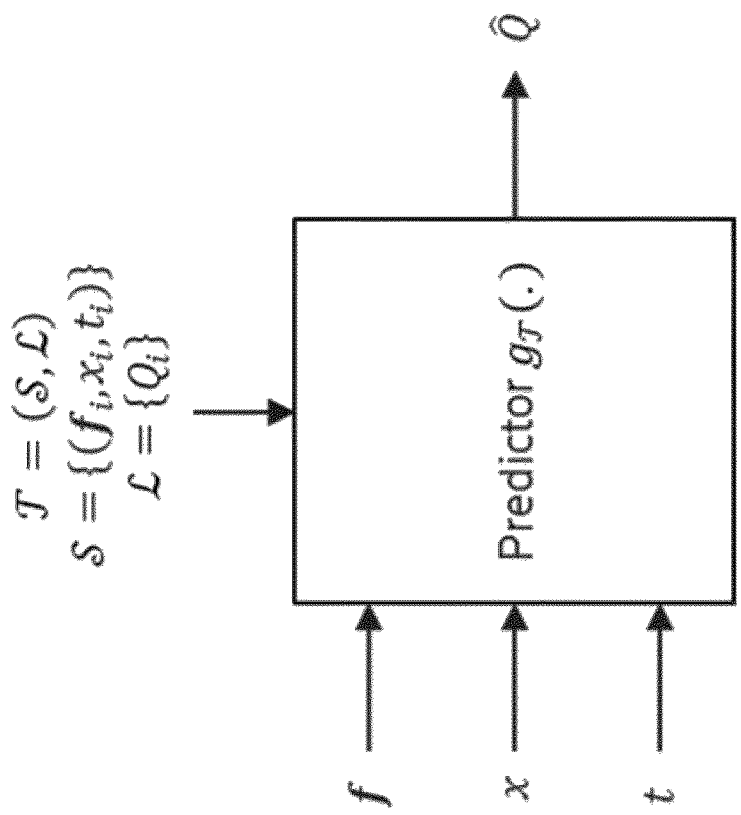
FIG. 2 shows a predictor function trained with a training data set.
Figure 1:
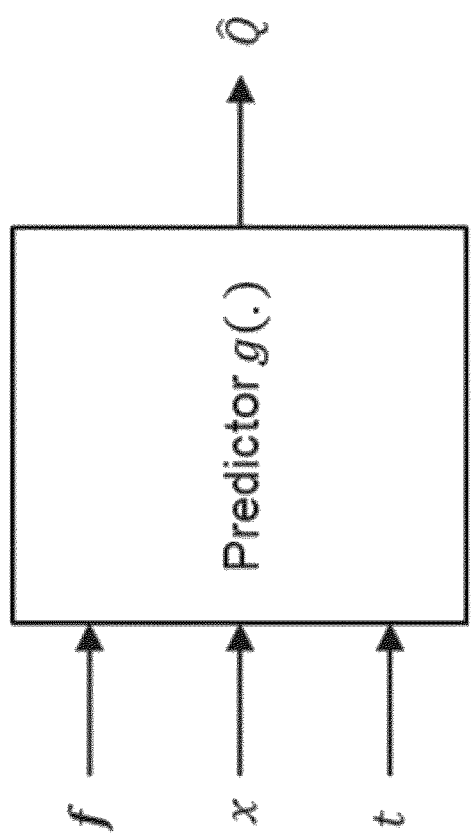
FIG. 1 shows a predictor function.
Figure 3:
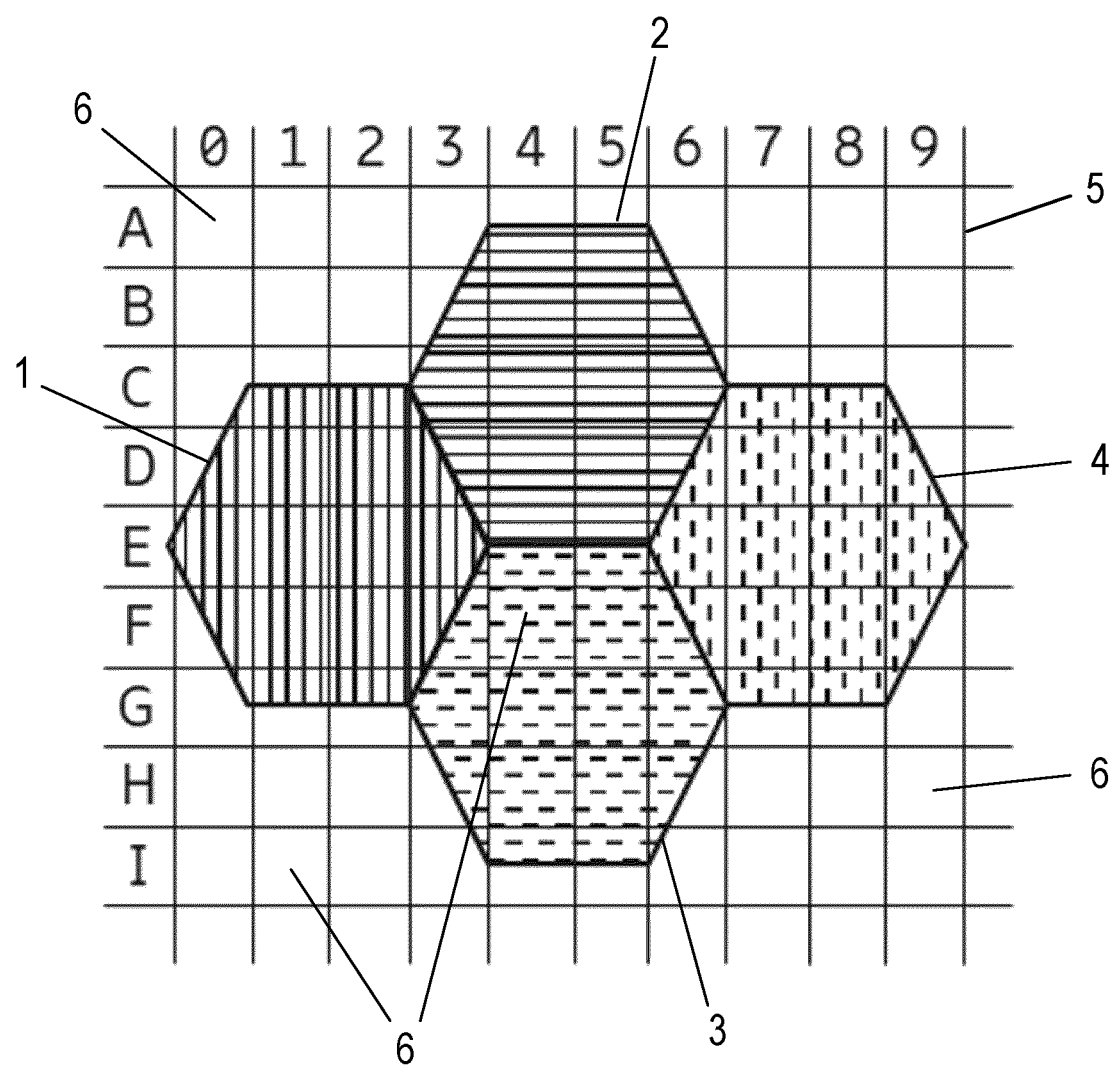
FIG. 3 illustrates the division of a geographical region into a plurality of areas.

Example 1: using the method to determine a position associated with a measurement—This example is based on the scenario shown in FIG. 3, with the UE having moved along a path through one or more of the cells 1, 2, 3, 4. A set of consecutive measurements is available which were obtained while a UE moved along a certain path. The measurements may include a time stamp t and a set of one or more features f, but not the position x of the UE at the time of the measurement. One of the features f is the cell that was serving the UE at the time of the measurement. This is referred to as the 'corresponding serving cell'. The set of measurements is as follows:

Measurement 1: feature(s) $f_1$ at time $t_1$ in Cell 1;
Measurement 2: feature(s) $f_2$ at time $t_2$ in Cell 2;
Measurement 3: feature(s) $f_3$ at time $t_3$ in Cell 2;
Measurement 4: feature(s) $f_4$ at time $t_4$ in Cell 2;
Measurement 5: feature(s) $f_5$ at time $t_5$ in Cell 4.

As noted, for the purpose of training a QoS prediction model, it is usually not sufficient to simply know the serving cell. However, highly accurate position information may also not be necessary either, and it can be sufficient to associate each of the measurement/observations with one of the areas 6 illustrated in FIG. 3. By inspecting the information carried by the five measurements, in particular the cell number/identity, it is reasonable to expect or assume that they were taken while the UE was travelling from Cell 1 to Cell 4. That is, looking at FIG. 3, it is reasonable to assume that:

Measurement 1 was taken while the UE was in an area close to or at the border between Cell 1 and Cell 2;
Measurement 2 was also taken while the UE was in an area close to or at the border between Cell 1 and Cell 2;
Measurement 3 was taken while the UE was in an area that is somewhere in the middle of Cell 2;
Measurement 4 was taken while the UE was in an area close to or at the border between Cell 2 and Cell 4;
Measurement 5 was also taken while the UE was in an area close to or at the border between Cell 2 and Cell 4.

Figure 9:
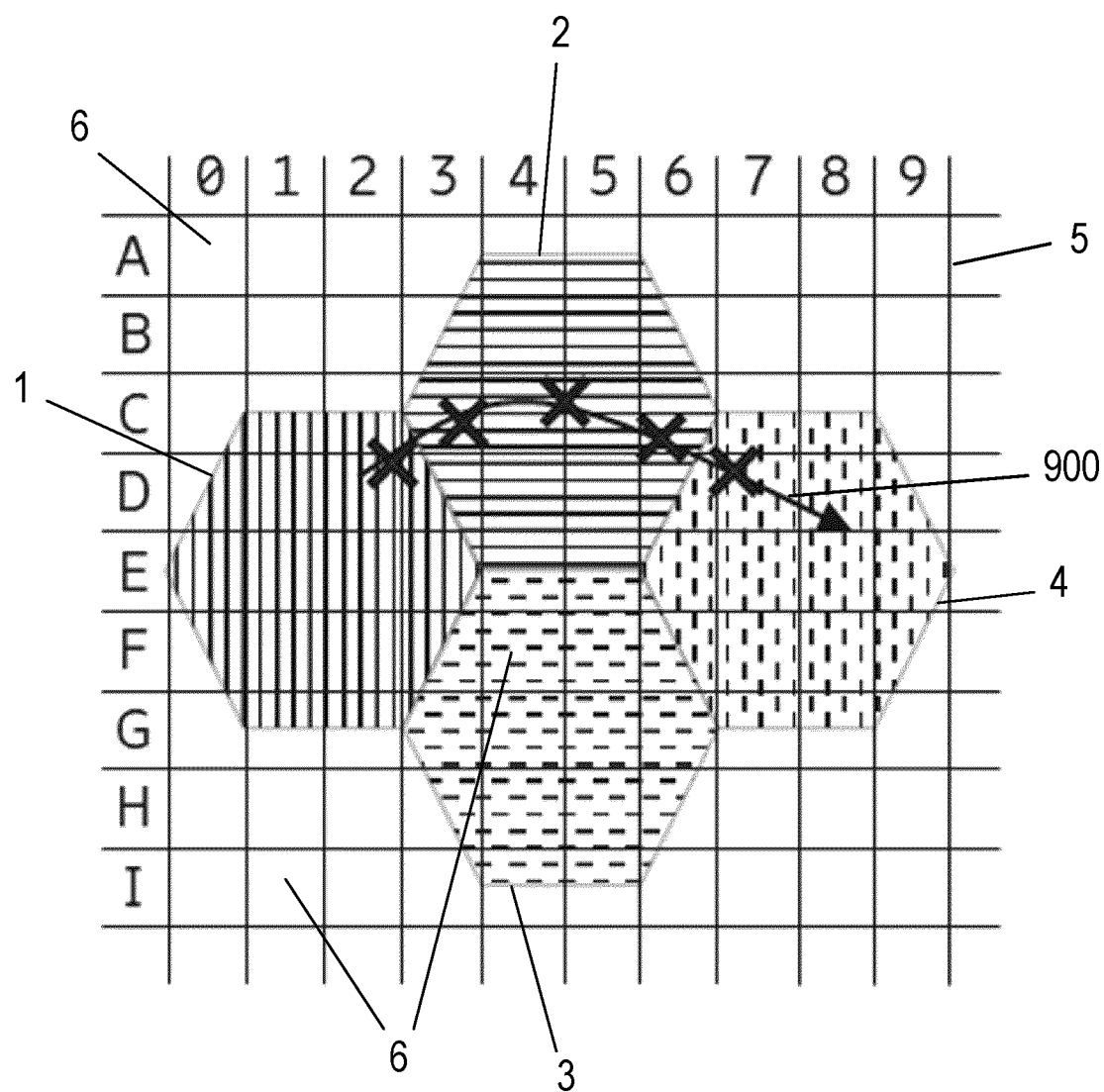
FIG. 9 illustrates a possible path of a UE through the region in FIG. 3.

FIG. 9 illustrates this possible path 900 through the cell arrangement of FIG. 3. The candidate positions (i.e. the areas in which the UE may have been located at the time of the measurements) are marked with an 'X'.

Figure 10:
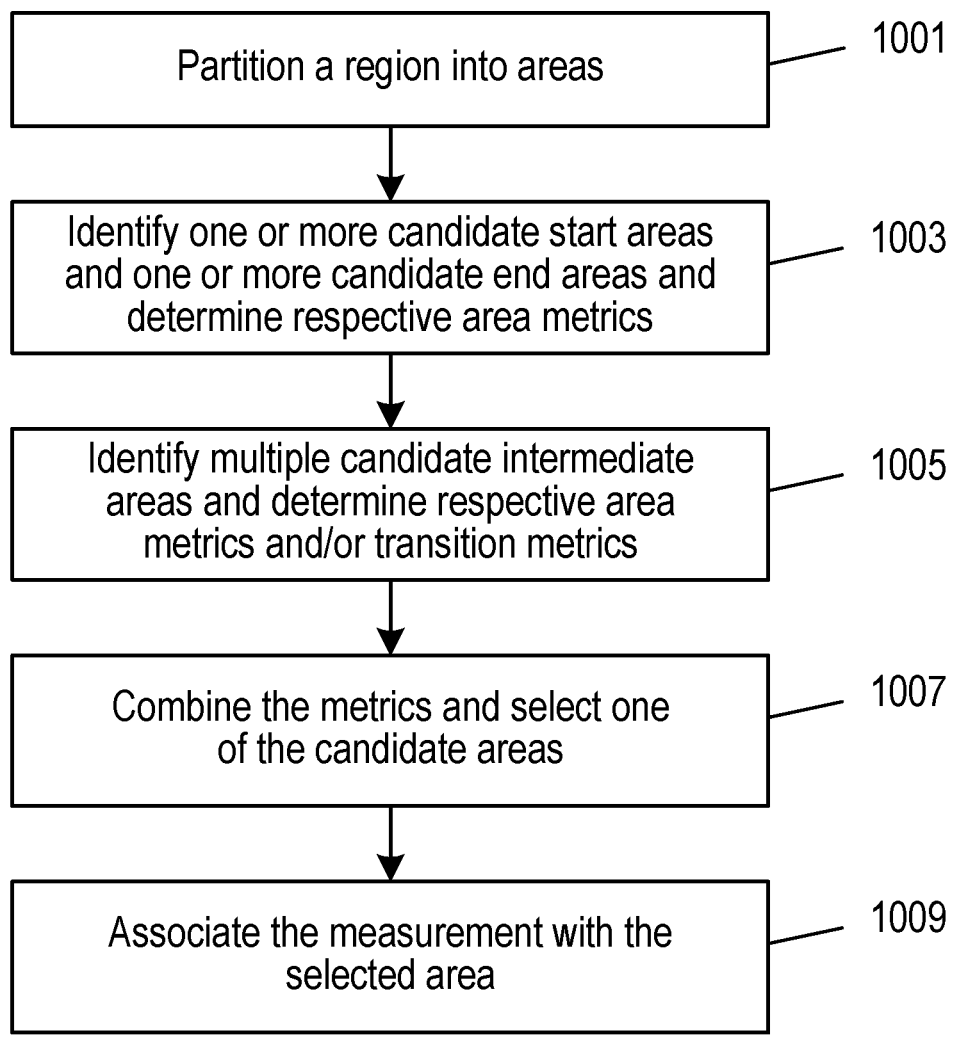
FIG. 10 is a flow chart illustrating an exemplary embodiment of a method of determining a path of movement of a UE and determining a position of the UE when a measurement was obtained.

The method described below and shown in FIG. 10 provides a more formal framework for using the feature(s) f as suggested above to determine the path of movement and a position of the UE when a particular measurement (denoted a 'first measurement') was obtained.

In step 1001, a large region is partitioned into areas. This partitioning can result in a grid 5 as shown in FIG. 3, although typically the large region will comprise many more than four cells.

Step 1003 comprises identifying one or more start areas, denoted $S_m^{start}$ and indexed by m, and one or more end areas, denoted $S_n^{end}$ and indexed by n. A start area is an area or candidate area for the start of the path of movement. An end area is an area or candidate area for the end of the path of movement. The location of the UE at the start and/or end of the path may be known, in which case step 1003 comprises identifying the start area and end area for the path. However, the start and/or end of the path may not be known, in which case multiple candidate start areas and/or multiple candidate end areas can be identified.

If multiple start areas $S_m^{start}$ are identified, each of them can be assigned a respective area metric $p(S_m^{start})$. If multiple end areas $S_n^{end}$ are identified, each of them can be assigned a respective area metric $p(S_n^{end})$. As noted above, an area metric represents the probability of the UE being in (or having been in) that area.

In some embodiments of step 1003, only one start area is identified. In this case an area metric may not be required for the start area. In some embodiments of step 1003, only one end area is identified. In this case an area metric may not be required for the end area.

Step 1005 comprises identifying multiple candidate intermediate areas, denoted $S_k^{mid}$ and indexed by k. The candidate intermediate areas are areas that the UE may have been in when traversing the path of movement. For different pairs of $S_k^{mid}$ and $S_m^{start}$, a respective transition metric $p(S_k^{mid}|S_m^{start})$ can be assigned. Likewise, for different pairs of $S_k^{mid}$ and $S_n^{end}$, a respective transition metric $p(S_n^{end}|S_k^{mid})$ can be assigned. Similarly, for different pairs of candidate intermediate areas $S_k^{mid}$, a respective transition metric $p(S_k^{mid,i}|S_k^{mid,j})$ can be assigned. As noted above, a transition metric represents the probability that the UE moved from one area in the pair to the other area in the pair. In some embodiments, area metrics $p(S_k^{mid})$ can also be determined for the candidate intermediate areas.

In some embodiments, step 1005 may comprise only determining transition metrics for areas that are adjacent to each other (including areas that partially overlap with each other), or that represent transitions that are possible in practice. These embodiments may be used where measurements by the UE from which the path of movement is to be determined (and to which positioning information is to be added) are made or obtained at relatively short intervals. In this situation, unless the UE is travelling at a high speed, it will not be possible for the UE to travel a long distance between consecutive measurements. As an alternative approach, transition metrics can be determined for non-adjacent or distant areas, but in this case the transition metric will have a value indicating that the transition is not possible or highly improbable.

In step 1007, for a candidate path of movement (i.e. comprising the start area or a candidate start area, one or more intermediate areas, and the end area or a candidate end area) a plurality of the area metrics and transition metrics for the areas in the candidate path can be combined to provide a path metric. Some or all of the relevant $p(S_m^{start})$, $p(S_n^{end})$, $p(S_k^{mid})$, $p(S_k^{mid}|S_m^{start})$, $p(S_k^{mid,i}|S_k^{mid,j})$ and $p(S_k^{end}|S_k^{mid})$ may be combined to form the path metric. From the path metrics, one of the candidate paths is selected, and the, or one of the, intermediate areas $S_k^{mid}$ in that path is selected according to the timing of the first measurement. That is, timing information is available for the first measurement, and it is possible to determine where in the sequence of measurements by the UE the first measurement is. The path of movement also has associated timing information, from, for example, the measurements and/or parameters used to identify the path, which enables the area that the UE was in at the time of the first measurement to be identified.

In step 1009 the first measurement is associated with the selected intermediate area.

Various embodiments and implementations of the steps in FIG. 10 are set out below. Unless expressly indicated, any of these embodiments and implementations can be used individually or in combination.

In some embodiments of step 1001, the plurality of areas are determined to be non-overlapping for a cell. For example, the coverage area of a cell may be divided into disjoint areas. In other embodiments of step 1001, there may be an overlap between such areas.

In some embodiments of step 1001, each area is associated with a single cell. That is, a particular area is not associated with multiple cells. If a certain point is served by multiple cells, then multiple overlapping areas may be defined, one for each serving cell.

Step 1001 is typically executed only once, or on very few occasions. That is, the partitioning of the large region into areas is done once and stored. Particularly where the location information is to be used to train a predictive model and subsequent inputs to the predictive model are to include location information, the same area partitioning should be used for associating location information to multiple (independent) measurements, performed at different times, potentially by different nodes or UEs, etc.

Various embodiments of step 1003 are described below in terms of the (candidate) start area $S_m^{start}$ and the area metric $p(S_m^{start})$. It will be appreciated that these embodiments are equally applicable to the (candidate) end area $S_n^{end}$ and the area metric $p(S_n^{end})$. These embodiments of step 1003 are also applicable to determining area metrics $p(S_k^{mid})$ for candidate intermediate areas $S_k^{mid}$ in step 1005.

In some embodiments of step 1003, a start area $S_m^{start}$ is identified and/or the corresponding area metric $p(S_m^{start})$ is determined based on one or more measurements or one or more parameters. The value of the measurement or parameter may be compared to previously reported measurements or parameters, or compared to a model (e.g. a propagation model), to determine the candidate start area(s) $S_m^{start}$ and/or assign them an area metric $p(S_m^{start})$. For example, any of the following measurements may be indicative of the proximity to a cell center or cell edge (and therefore indicative of where a candidate start area might be): a signal quality measurement such as a received power or strength (e.g. RSSI, RSRP, etc.); a channel quality measurement or indicator (e.g. Signal to Noise Ratio (SNR), Signal to Interference and Noise Ratio (SINR), Reference Signal Received Quality (RSRQ), etc.); a timing advance, a serving cell ID; or channel state information (CSI) (e.g. including Precoder Matrix Indication (PMI), Channel Quality Indicator (CQI), Rank Indicator (RI), etc.).

The measurement or parameter may be determined by the node executing the method, or by a UE or another node, and reported to the node executing the method. This determination may happen prior to the execution of the method or as part of it.

In some embodiments of step 1003, a start area $S_m^{start}$ is identified and/or the corresponding metric $p(S_m^{start})$ is determined based on comparing two measurements, for example two consecutive measurements. For example, there may be two measurements that were performed in a short interval, with the first one indicating that the UE is in Cell 1 and the second one indicating that the UE is in Cell 2. Consequently, $S_m^{start}$ may be the area(s) close to the border between Cell 1 and Cell 2. Similarly, the area metric $p(S_m^{start})$ may assign a higher likelihood of being in a start area $S_m^{start}$ that is close to the border than to an area that is far away from it.

In some embodiments of step 1003, a start area $S_m^{start}$ is identified and/or the corresponding area metric $p(S_m^{start})$ determined using information about the road and/or railway infrastructure in the start area $S_m^{start}$. These embodiments may be particularly useful when the UE is mounted in or on a vehicle. For example, the area metric $p(S_m^{start})$ can be determined to give a higher likelihood to the UE being in an area with a high-capacity road (e.g. a highway), than in an area with a low-capacity road (e.g. a single-lane street); while the area metric $p(S_m^{start})$ may assign no or little likelihood of the UE being in an area $S_m^{start}$ where there is no road or railway infrastructure at all. If the area metric indicates that there is no likelihood of the UE being in that area $S_m^{start}$, that area may be skipped altogether (e.g. not identified or dropped after being identified) when determining transition metrics in step 1005 and/or when combining the metrics in step 1007. Similarly, the area metric may be determined using road network information, for example information on the road infrastructure (e.g. location of roads, the type of roads, speed limits, etc.), historical or statistical information or records relating to the utilisation (e.g. traffic) of the roads in the road network, live traffic information, etc. This embodiment may require the node performing the method to query a database to acquire the road/railway network information.

The following provides some examples of assigning or determining area metrics for two candidate start areas $S_1^{start}$ or $S_2^{start}$. These examples are applicable to area metrics for candidate end areas and candidate intermediate areas. Any of the examples can be used individually or in combination.

In a first set of the examples the area metrics are based on measurements. The method may have access to one RSSI value for the UE and intends to determine whether the UE was in $S_1^{start}$ or $S_2^{start}$ at the time the RSSI was measured. $S_1^{start}$ is closer to the base station than $S_2^{start}$. The RSSI is a rough indication of the path loss between the base station and the UE. Consequently, $S_1^{start}$ is assigned an area metric $p(S_1^{start})$ equal to A1 and $S_2^{start}$ is assigned an area metric $p(S_2^{start})$ equal to A2, where A1>A2, meaning that $S_1^{start}$ is deemed more likely than $S_2^{start}$.

The above example can be improved by adding knowledge about the propagation in a cell. For example, a channel model can be used that is known to approximate the propagation in the cell to determine whether it is more likely that the RSSI value was measured in $S_1^{start}$ or in $S_2^{start}$.

The above example can also or alternatively be improved by taking into account several measurements. For example, many consecutive RSSI measurements can be taken into account. These measurements could indicate that the UE went through an area with poor coverage, such as a tunnel.

In a second set of the examples the area metrics are based on road infrastructure. For example $S_1^{start}$ could cover or include a road with capacity of C1 vehicles per hour. $S_2^{start}$ could cover a road with capacity of C2 vehicles per hour. $S_1^{start}$ can be assigned an area metric $p(S_1^{start})$ of: C1/(C1+C2). $S_2^{start}$ could be assigned an area metric $p(S_2^{start})$ of: C2/(C1+C2).

In a third set of the examples, the area metrics are based on road traffic information. These examples are similar to the second set of examples, but make use of information about how much traffic is/was using the roads in the areas rather than using road capacity.

Various embodiments of step 1005 are described below in terms of the transition metric $p(S_k^{mid}|S_m^{start})$. It will be appreciated that these embodiments are equally applicable to the transition metric $p(S_n^{end}|S_k^{mid})$ and/or the transition metric $p(S_k^{mid,i}|S_k^{mid,j})$.

In some embodiments of step 1005, the transition metric $p(S_k^{mid}|S_m^{start})$ depends on the distances between the relevant areas $S_m^{start}$ and $S_k^{mid}$. For example, the transition metric can give a higher likelihood of transition between $S_m^{start}$ and $S_k^{mid}$ if those areas are close to each other, than for areas $S_m^{start}$ and $S_k^{mid}$ that are far apart from each other.

In some embodiments of step 1005, a candidate area $S_k^{mid}$ can be identified and/or the corresponding transition metric $p(S_k^{mid}|S_m^{start})$ determined based on one or more measurements or one or more parameters. The value of the measurement or parameter may be compared to previously reported measurements or parameters or to a model (e.g. a propagation model) to determine the candidate intermediate area(s) and/or to assign them transition metrics. The measurements and/or parameters described in connection with step 1003 are also applicable to step 1005. The measurement and/or parameter may be determined by the node executing the method, by a UE or by another node, and reported to the node executing the method. This determination may happen prior to the execution of the method or as part of it.

In some embodiments of step 1005, a candidate intermediate area $S_k^{mid}$ can be identified and/or the corresponding transition metric $p(S_k^{mid}|S_m^{start})$ determined based on comparing two measurements, for example two consecutive measurements. For example, there may be two measurements that were performed in a short interval, with the first one indicating that the UE is in Cell 1 and the second indicating that the UE is in Cell 2. Consequently, $S_k^{mid}$ may be the area(s) close to the border between Cell 1 and Cell 2. Similarly, the transition metric $p(S_k^{mid}|S_m^{start})$ may assign a higher likelihood of being in an intermediate area $S_k^{mid}$ that is close to the border than to an intermediate area that is far away from it.

In some embodiments of step 1005, the candidate intermediate area $S_k^{mid}$ is identified and/or the corresponding transition metric $p(S_k^{mid}|S_m^{start})$ determined using information about the road and/or railway network/infrastructure connecting the areas $S_m^{start}$ and $S_k^{mid}$. These embodiments may be particularly useful when the UE is mounted in or on a vehicle. For example, the transition metric $p(S_k^{mid}|S_m^{start})$ can be determined to give a higher likelihood to a transition between $S_m^{start}$ and $S_k^{mid}$ when they are connected by a high-capacity road (e.g. a highway), than when they are connected by a low-capacity road (e.g. a single-lane street); while the transition metric $p(S_k^{mid}|S_m^{start})$ may assign no or little likelihood of the UE transitioning between $S_m^{start}$ and $S_k^{mid}$ if the two areas are not connected by any roads and/or railway. Similarly, the transition metric may be determined using road network information, for example information on the road infrastructure (e.g. location of roads, the type of roads, speed limits, etc.), historical or statistical information or records relating to the utilisation (e.g. traffic) of the roads in the road network, live traffic information, etc. This embodiment may require the node performing the method to query a database to acquire the road/railway network information.

The transition metric $p(S_k^{mid}|S_m^{start})$ can be referred to as a forward transition metric. The forward transition metric represents a likelihood that the terminal device traversed to the intermediate area from the start area. In some embodiments, backward transition metrics $p(S_m^{start}|S_k^{mid})$ can also or alternatively be computed/assigned. The backward transition metric represents a likelihood that the terminal device arrived in the end area from the intermediate area. In general, for given areas $S_m^{start}$ and $S_k^{mid}$, the forward and backwards transition metrics may be different, but in some embodiments they are the same, i.e. $p(S_k^{mid}|S_m^{start})=p(S_m^{start}|S_k^{mid})$.

The following provides some examples of assigning or determining transition metrics. Any of the examples can be used individually or in combination.

In a first set of examples, the transition metrics are based on measurements. The method may have access to measurement pairs, e.g. (RSSI, Cell_ID) obtained at subsequent times (T1<T2<T3<T4), with the following values:

At time T1, (RSSI, Cell_ID)=(Value1, Cell_1)
At time T2, (RSSI, Cell_ID)=(Value2, Cell_1)
At time T3, (RSSI, Cell_ID)=(Value3, Cell_2)
At time T4, (RSSI, Cell_ID)=(Value4, Cell_2)

The method can determine that the measurements were taken in the border area between Cell 1 and Cell_2 because there was a change of Cell_ID between T2 and T3.

There are two candidate areas in Cell 1, denoted $S_1^{mid,1}$, and $S_1^{mid,1}$, and two candidate areas in Cell_2, denoted $S_1^{mid,2}$, and $S_2^{mid,2}$. Four transition metrics are determined: $p(S_1^{mid,2}|S_1^{mid,1})$, $p(S_1^{mid,2}|S_2^{mid,1})$, $p(S_2^{mid,2}|S_1^{mid,1})$, and $p(S_2^{mid,2}|S_2^{mid,1})$.

The different transition metrics may be determined by analysing Value1, Value2, Value3 and Value4. For example, if Value1 and Value2 are (relatively) low, it may be determined that $S_2^{mid,1}$ is more likely than $S_1^{mid,1}$ because the former is further away from the base station than the latter. Similarly, if Value3 and Value4 are (relatively) high, it may be determined that $S_1^{mid,2}$ is more likely than $S_2^{mid,2}$ because the former is closer to the base station than the latter. This can be used to assign or determine the transition metrics.

In some examples the transition metrics may reflect information about or from channel models, etc. In some examples, knowledge of the Cell_ID is not necessary in determining the transition metrics.

In some embodiments of step 1007, the combined metric (path metric) for a candidate path comprising a plurality of the areas can be obtained by combining a plurality of the metrics relevant to the areas in the candidate path. Thus, the path metric can be obtained by combining some, or all, of the area and/or transition metrics relevant to the areas in the candidate path. In some embodiments, the metrics can be combined by multiplying the metrics together. The relevant metrics can include the area metrics for any of the areas in the candidate path, and the transition metrics for transitions between pairs of areas in the candidate path. Two examples of a combined metric for a candidate path comprising a start area, a single intermediate area and an end area are shown below:

$p(S_n^{end}|S_k^{mid})p(S_k^{mid}|S_m^{start})p(S_m^{start})$, or
$p(S_n^{end})p(S_n^{end}|S_k^{mid})p(S_k^{mid}|S_m^{start})p(S_m^{start})$ It will be noted that in this first example, the path metric is formed from a single area metric (for the start area), and transition metrics between the start area and the intermediate area, and between the intermediate area and the end area. In the second example the path metric is formed from area metrics for the start area and the end area, and transition metrics between the start area and the intermediate area, and between the intermediate area and the end area.

In some embodiments of step 1007, the combined metric (path metric) may be a forward path metric; or a backward path metric; or a combination of a forward path metric with a backward path metric. The forward path metric is computed by taking $S_m^{start}$ as the start area and finding the way to the end area $S_n^{end}$. The backward path metric is computed by starting from the end area $S_n^{end}$ and finding the way to the start area $S_m^{start}$. Examples of a forward path metric and a backward path metric for a candidate path comprising a start area, a single intermediate area and an end area are shown below:

Forward metric: $p(S_n^{end}|S_k^{mid})p(S_k^{mid}|S_m^{start})p(S_m^{start})$
Backward metric: $p(S_n^{end})p(S_k^{mid}|S_n^{end})p(S_m^{start}|S_k^{mid})$ In some embodiments, the combined path metric may be obtained by multiplying the forward path metric with the backward path metric.

In some embodiments of step 1007, the candidate path with the largest metric (or the smallest metric, depending on the form of the metric) is selected as the path of movement.

In some embodiments of step 1007, different candidate paths are formed with different intermediate areas. Some examples of candidate paths having different intermediate areas $S_{k,j}^{mid}$ are shown below. That is, the alternative intermediate areas $S_{k,j}^{mid}$, together with $S_m^{start}$ and $S_n^{end}$, define multiple candidate paths. For example:

Path 1: $S_m^{start} \to S_{k,1}^{mid} \to S_n^{end}$
Path 2: $S_m^{start} \to S_{k,2}^{mid} \to S_n^{end}$
Path j: $S_m^{start} \to S_{k,j}^{mid} \to S_n^{end}$ In some embodiments of step 1007, one or more of the candidate paths can include multiple intermediate areas. The number of intermediate areas may depend on the distance between the start area and the end area in the candidate path. Paths having multiple intermediate areas are discussed further below with reference to Example 3. In the case of multiple intermediate areas $S_k^{mid,i}$, a candidate path can be:

$S_m^{start} \to S_k^{mid,1} \to S_k^{mid,2} \to \ldots \to S_k^{mid,i} \to \ldots \to S_n^{end}$.

Each of the candidate paths has a respective path metric (e.g. a probability of the path being the correct one).

In some embodiments, rather than selecting a single candidate path as the path of movement, multiple candidate paths can be selected in step 1007. This embodiment may particularly be useful where multiple candidate paths have similar likelihoods of being correct. For example there could be multiple candidate paths with similar path metrics (e.g. 34%, 33%, and 33%), and it would be better to keep all of them, together with information about their likelihood, than selecting only the path with the marginally higher path metric.

Consequently, there may be multiple candidate intermediate areas $S_{k,j}^{mid}$ (with respective path metrics) that could be associated with the first measurement. In step 1009 in the procedure, each of the selected $S_{k,j}^{mid}$ can be associated with the same first measurement.

For example, the three most likely candidate paths can be selected by the procedure. These would be:
Path 1: $S_m^{start} \to S_{k,1}^{mid} \to S_n^{end}$
Path 2: $S_m^{start} \to S_{k,2}^{mid} \to S_n^{end}$
Path j: $S_m^{start} \to S_{k,j}^{mid} \to S_n^{end}$ The candidate intermediate area is different for each of these paths, and so is the path metric associated with them. In this case, the output of step 1007 would be:

Measurement M is associated with Path 1. The path metric is $P_1$.
Measurement M is associated with Path 2. The path metric is $P_2$.
Measurement M is associated with Path j. The path metric is $P_j$.

In some embodiments of step 1009, the first measurement together with information on the selected area (in which the UE was located when the first measurement was obtained) is used as part of a training data set to train a machine learning algorithm. The machine learning algorithm may be a predictive QoS algorithm.

In some embodiments of step 1009, the first measurement together with information on the selected area (in which the UE was located when the first measurement was obtained) is input to a trained machine learning algorithm. In some embodiments, the machine learning algorithm may be a predictive QoS algorithm, and the trained predictive QoS algorithm may use the first measurement and the information on the selected area to predict a future value of a QoS metric for the UE or another UE.

In the embodiments of step 1007 above where multiple alternative paths are identified or selected, each of these multiple alternative paths, or each of the relevant intermediate areas associated with the first measurement can be used in training the ML model or in determining the prediction by the trained ML model. In this training or use of the multiple alternative paths or relevant intermediate areas, the alternative paths or intermediate areas may be weighted according to the importance of each alternative path indicated by the respective combined path metric. For example two candidate paths may be possible, and, given the existing data, there may be a 90% likelihood that the first candidate path is correct, and a 10% likelihood that the second candidate path is correct. Instead of assuming that the UE took the first candidate path, the ML model can be trained using the information for both candidate paths, but use weightings to assign a higher importance or significance to the first path.

As discussed in Example 2 below; the complexity of the above procedure can grow exponentially with the number of different areas. It also grows with the number of transitions between areas. One way to limit the complexity is to restrict the number of areas under consideration and/or restrict the number of transitions that can occur in a path of movement. One way to restrict the number of areas and/or transitions is to only evaluate transitions that take place between neighbouring areas. Another way to restrict the number of areas and/or transitions limit the complexity is to discard from further consideration any area and/or transition with a respective metric that gives them low importance/likelihood. For example, the importance or likelihood may be compared to a threshold, and only those that meet the threshold may be considered further in forming the candidate paths. Another way to restrict the number of areas and/or transitions is to, when determining the candidate paths, only consider a given number of areas and/or transitions, typically the ones with highest relevance according to the corresponding metric.

Figure 11:
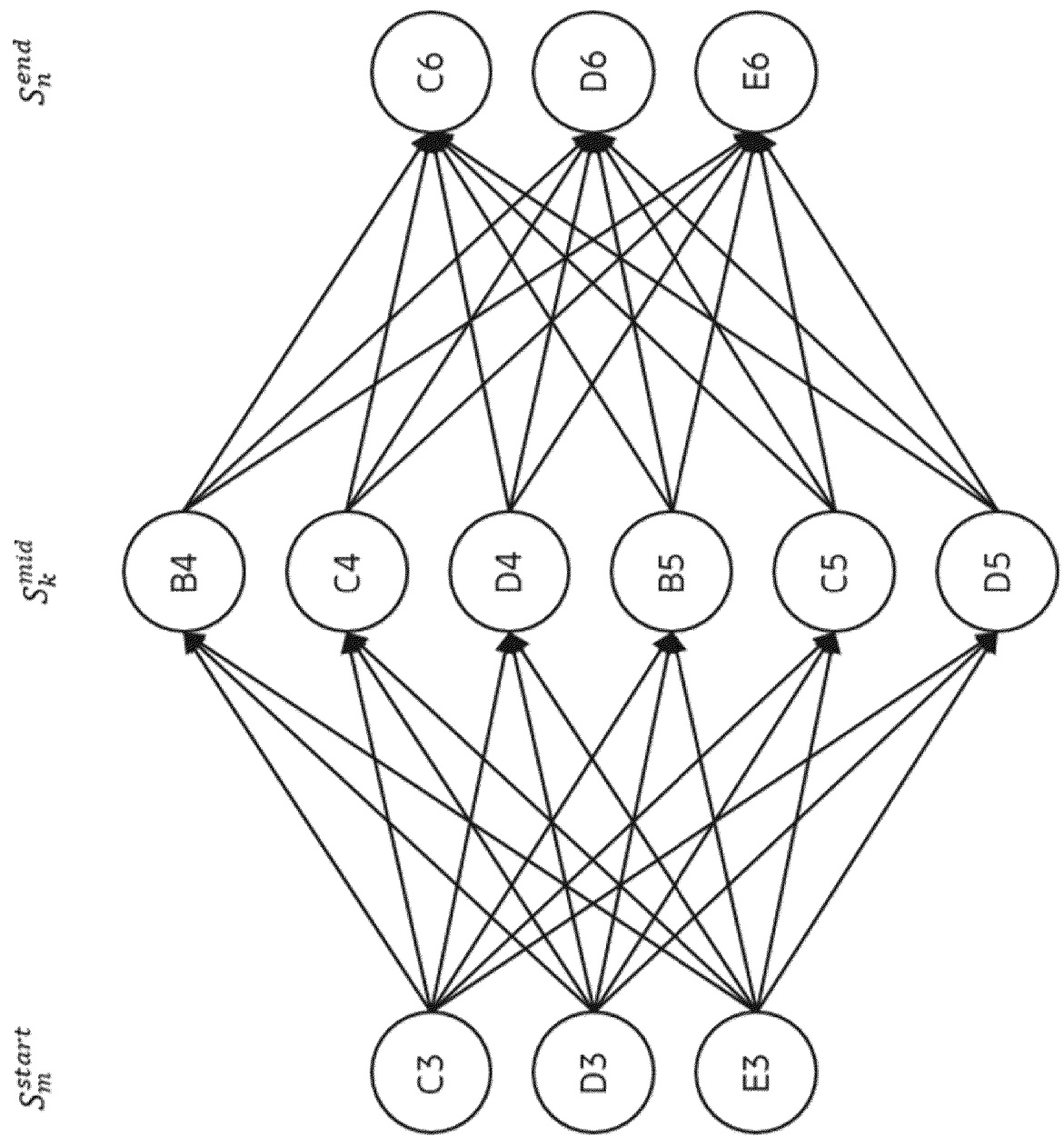
FIG. 11 is a representation of candidate areas and paths in the form of a trellis diagram.

Example 2: representation using a Trellis diagram—The application of the method described herein, in particular steps 1003-1007, can be represented in the form of a Trellis diagram or graph, as shown in FIG. 11. In this diagram, a node (i.e. a circle) corresponds to an area and an edge (i.e. an arrow) corresponds to a transition between two areas. Different columns (of nodes) are associated with different areas that need to be determined. For example, in FIG. 11:

The left column of nodes corresponds to the set of candidate start areas $S_m^{start} \in \{C3, D3, E3\}$ from Example 1. Each of these nodes is associated with an area metric $p(S_m^{start})$.

The middle column of nodes corresponds to the set of candidate intermediate area $S_k^{mid} \in \{B4, C4, D4, B5, C5, D5\}$ from Example 1. Each edge from a left-column node to a middle-column node is associated with a transition metric $p(S_k^{mid}|S_m^{start})$.

The right column of nodes corresponds to the set of candidate end areas $S_n^{end} \in \{C6, D6, E6\}$ from Example 1. Each of these nodes is associated with an area metric $p(S_n^{end})$ and each edge from a middle-column node to a right-column node is associated with a transition metric $p(S_k^{end}|S_k^{mid})$.

Finding the candidate intermediate area with the largest metric (or finding the intermediate area in the candidate path with the largest metric) is similar to decoding codes on a trellis (e.g. convolutional codes), or more generally operating with hidden Markov models (HMM). For this purpose, one of the existing algorithms may be used. For example, the Viterbi algorithm finds the maximum likelihood (ML) path; the BCJR algorithm finds the maximum a posteriori (MAP) path. These two are instances of a more general algorithm known as belief propagation (BP). The complexity of applying one of these BP instances grows exponentially with the number of nodes (i.e. the number of areas). Other algorithms can be used, such as tree decoders, sequential decoders (including a stack algorithm, Z-J algorithm, Fano algorithm, Creeper algorithm, etc.

Example 3: determination of multiple intermediate positions—Consider again the situation illustrated in FIG. 9 and assume that it is known that $S^{start}=D2$ and $S^{end}=D7$. In this case, $p(S_m^{start})=p(S_n^{end})=1$. The goal is to identify the intermediate areas corresponding to each of three (consecutive) measurements taken while the UE was travelling between $S^{start}$ and $S^{end}$ along the path 900. The measurements by the UE include an RSRP value. By comparing the RSRP values to previously obtained knowledge (e.g. previously obtained measurements/RSRP values, although not necessarily measurements obtained by the UE of interest, or knowledge obtained from a propagation model), it is determined that:

For the first intermediate position, there are three candidate intermediate areas $S_m^{mid,1} \in \{C3, D3, E3\}$. For each of them a transition metric $p(S_k^{mid,1}|S_m^{start})$ is determined.

For the second intermediate position, there are four candidate intermediate areas $S_m^{mid,2} \in \{C4, C5, D4, D5\}$. For each of them a transition metric $p(S_k^{mid,2}|S_k^{mid,1})$ is determined.

For the first intermediate position, there are two candidate intermediate areas $S_k^{mid,3} \in \{C6, D6\}$. For each of them transition metrics $p(S_k^{mid,3}|S_k^{mid,2})$ and $p(S_n^{end}|S_k^{mid,3})$ are determined.

Figure 12:
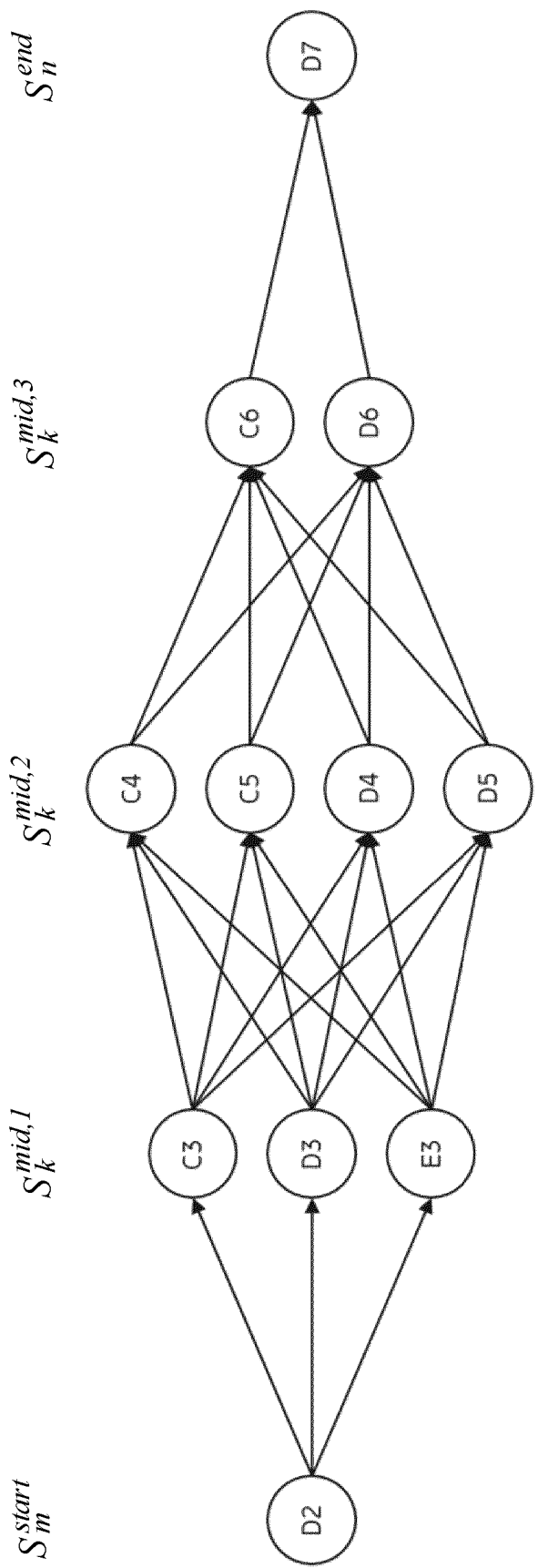
FIG. 12 is another representation of candidate areas and paths in the form of a trellis diagram.

The corresponding trellis diagram is shown in FIG. 12. A combined metric (path metric) is obtained for each valid path. For example, for the path $S_m^{start} \to S_k^{mid,1} \to S_k^{mid,2} \to S_k^{mid,3} \to S_n^{end}$, the path metric can be $p(S_n^{end}|S_k^{mid,3}) p(S_k^{mid,3}|S_k^{mid,2}) p(S_k^{mid,2}|S_k^{mid,1}) p(S_k^{mid,1}|S_m^{start})$. The path with the largest metric is selected, which determines the intermediate areas to be areas $S_k^{mid,1}$, $S_k^{mid,2}$ and $S_k^{mid,3}$. In step 1009, each determined intermediate area can be associated with a different measurement.

Figure 13:
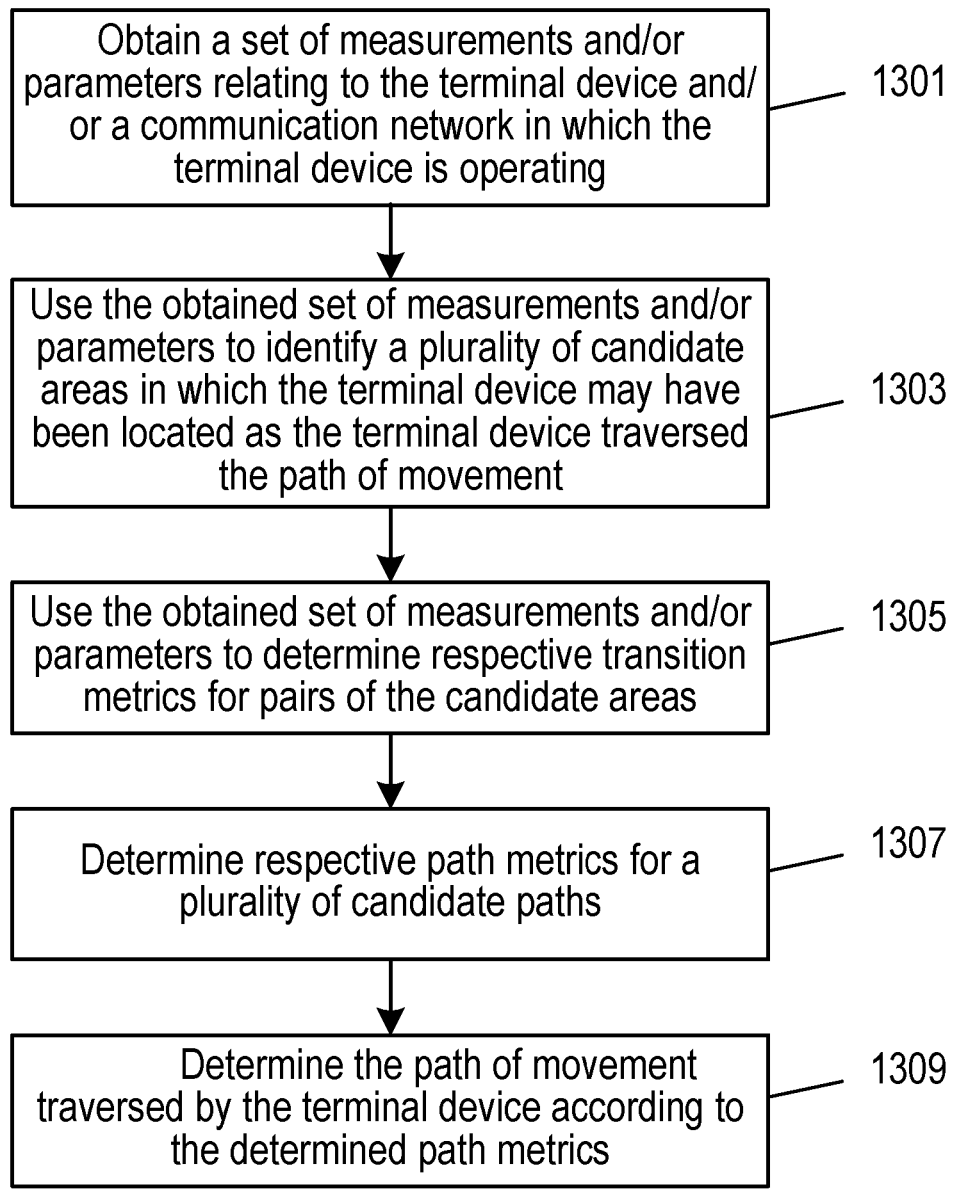
FIG. 13 is a flow chart illustrating a method of determining a path of movement of a UE according to various embodiments.

The flow chart in FIG. 13 illustrates a method of determining a path of movement of a first terminal device according to various embodiments. In some embodiments, the first terminal device is implemented in, or implemented as, a vehicle. This method can be performed by any node or apparatus, such as a network node (e.g. an access network node 410 or a core network node 408), a UE/terminal device 412 or a server 416. A network node, terminal device or server can perform the method in response to the respective processing circuitry executing suitably configured computer program code.

In step 1301, the apparatus obtains a set of measurements and/or parameters relating to the first terminal device and/or a communication network in which the first terminal device is operating. The measurements and/or parameters in the obtained set were obtained or measured as the terminal device traversed a path of movement through a plurality of areas. Step 1301 can comprise any one or more of: performing the measurements, obtaining or receiving the measurements and/or parameters from the first terminal device, another terminal device or one or more network nodes, retrieving the measurements and/or parameters from a memory. One or more of the measurements and/or parameters may be associated with a particular area of the communication network (i.e. the measurements and/or parameters may relate to a particular area). In some embodiments, the set of measurements and/or parameters can comprise timing information indicating when the measurements were made and/or timing information indicating when the parameters were applicable.

The set of measurements and/or parameters can comprise any one or more of: signal quality measurements by the terminal device and/or the communication network (e.g. RSRP, RSSI); channel quality measurements by the terminal device and/or the communication network (e.g. SNR, SINR, RSRQ); a timing advance; an identifier (Cell_ID) of one or more cells of the communication network serving the terminal device; and CSI for one or more channels between the terminal device and the communication network (e.g. PMI, CQI, RI).

In step 1303, the apparatus uses the obtained set of measurements and/or parameters to identify a plurality of candidate areas in which the terminal device may have been located as the terminal device traversed the path of movement. Step 1303 also comprises determining or assigning a respective area metric to some or all of the plurality of candidate areas that indicate a likelihood that the terminal device was in the candidate area as the terminal device traversed the path of movement. In some embodiments, the area metrics are determined using the obtained set of measurements and/or parameters. In some embodiments, an area metric for a first candidate area can be determined by comparing respective measurements and/or parameters for the first candidate area and another candidate area adjacent to the first candidate area.

The communication network in which the terminal device is operating can be a cellular communication network, and each area can be smaller than the area covered by an individual cell in the communication network.

In some embodiments, the areas in the plurality of areas are non-overlapping. In other embodiments, at least two areas in the plurality of areas partially overlap.

At least one of the candidate areas can be a candidate start area for the start of the path, i.e. an area in which the terminal device was located at the start of the path of movement. In some embodiments, step 1303 identifies a single start area, in which case an area metric for that area may not be required. In other embodiments, step 1303 identifies a plurality of candidate start areas, and area metrics are determined for each candidate start area.

At least one of the candidate areas can be a candidate end area for the start of the path, i.e. an area in which the terminal device was located at the end of the path of movement. In some embodiments, step 1303 identifies a single end area, in which case an area metric for that area may not be required. In other embodiments, step 1303 identifies a plurality of candidate end areas, and area metrics are determined for each candidate end area.

At least one of the candidate areas in the plurality of areas identified in step (ii) is a candidate intermediate area for the path, i.e. an area that the terminal device passed through when travelling along the path of movement. Intermediate areas are those that are adjacent to at least one other area (i.e. a start area, candidate start area, intermediate area, candidate intermediate area, end area or candidate end area) in the plurality of candidate areas. In some embodiments, step 1303 identifies a single intermediate area, in which case an area metric for that area may not be required. In other embodiments, step 1303 identifies a plurality of candidate intermediate areas, and area metrics are determined for each candidate intermediate area.

In step 1305, the apparatus uses the obtained set of measurements and/or parameters to determine respective transition metrics for pairs of the candidate areas. A transition metric for a pair of candidate areas indicates a likelihood that the terminal device moved from a first candidate area in the pair to the other candidate area in the pair. Candidate areas in a pair can be candidate areas that are adjacent to each other, or that are within a predetermined distance of each other. In some embodiments, the area metrics are determined using the obtained set of measurements and/or parameters.

In some embodiments, a transition metric for a pair of candidate areas can be determined by comparing respective measurements and/or parameters for the candidate areas in the pair. In some embodiments, the transition metric for a pair of candidate areas is determined based on a distance between the pair of candidate areas.

In some embodiments of step 1303 and/or 1305, one or more of the area metrics and/or one or more of the transition metrics can be determined using information relating to a road network and/or a rail network in the plurality of areas. Such information can indicates a road infrastructure and/or road traffic or utilisation.

It will be appreciated that steps 1303 and 1305 are similar way to steps 1003 and 1005 described above, and steps 1303 and 1305 can be performed according to any of the examples and embodiments of steps 1003 and 1005.

In step 1307 the apparatus determines respective path metrics for a plurality of candidate paths. The path metric represents the likelihood that the candidate path is the path of movement taken by the terminal device. A candidate path comprises a series of the candidate areas, and the path metric for a candidate path is formed from a combination of the area metrics and transition metrics for the candidate areas in the candidate path.

Step 1307 can comprise forming a plurality of candidate paths from different ones of the plurality of candidate areas. In some embodiments of step 1307, any candidate areas for which the respective area metric and/or associated transition metrics do not meet a criterion can be discarded; and the candidate paths can be formed from the remaining candidate areas. The criterion may comprise the likelihood represented by that area metric or transition metric being above a threshold.

Some embodiments of step 1307 comprise determining a path metric as a forward path metric representing a likelihood that the terminal device traversed from a start area in the respective candidate path to an end area in the respective candidate path. In other embodiments of step 1307, a path metric is determined as a backward path metric representing a likelihood that the terminal device arrived in an end area in the respective candidate path from a start area in the respective candidate path.

In some embodiments, the path metrics are formed by multiplying one or more of the area metrics and/or one or more of the transition metrics for the candidate areas in the candidate path.

In step 1309 the apparatus determines the path of movement traversed by the terminal device according to the determined path metrics. In some embodiments, the path of movement traversed by the terminal device can be determined as the candidate path having the path metric indicating the highest likelihood.

In some embodiments, one or both of steps 1307 and 1309 can be performed using a belief propagation algorithm, a tree decoder or a sequential decoder.

In some embodiments, the method further comprises partitioning a geographical region served by the communication network into the plurality of areas. This step will be performed prior to step 1303, but may not be performed each time that the apparatus performs the method in FIG. 13.

In some embodiments, having identified the path of movement of the terminal device, the information provided by the path of movement can be used to 'fill-in' location/position information for measurements that are otherwise missing location information. In this case the method can further comprise identifying the area in the determined path in which the terminal device was located when a first measurement was obtained based on a timing of the first measurement.

In some embodiments the first measurement can be associated with the identified area in a training data set; and the training data set can be used to train a machine learning model. The machine learning model may be a predictive QoS model that predicts a QoS metric for the communication network.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A computer-implemented method for determining a path of movement of a terminal device, the method comprising:
   obtaining a set of at least one of measurements or parameters relating to at least one of the terminal device or a communication network in which the terminal device is operating, wherein the at least one of respective measurements or respective parameters in the received set were obtained as the terminal device traversed the path of movement through a plurality of areas;
   using the obtained set of the at least one of measurements or parameters to identify a plurality of candidate areas in which the terminal device have been located as the terminal device traversed the path of movement, wherein one or more of the plurality of candidate areas has an associated area metric indicating a likelihood that the terminal device was in the candidate area as the terminal device traversed the path of movement;
   using the obtained set of the at least one of measurements or parameters to determine respective transition metrics for pairs of the candidate areas, wherein a transition metric for a pair of candidate areas indicates a likelihood that the terminal device moved from a first candidate area in the pair to the other candidate area in the pair;
   determining respective path metrics for a plurality of candidate paths, wherein a candidate path comprises a series of the candidate areas, and wherein the path metric for a candidate path is formed from a combination of the area metrics and transition metrics for the candidate areas in the candidate path; and
   determining the path of movement traversed by the terminal device according to the determined path metrics.

2. The method as claimed in claim 1, wherein at least one of the candidate areas in the plurality of areas is a candidate start area for the start of the path.

3. The method as claimed in claim 1, wherein at least one of the candidate areas in the plurality of areas is a candidate end area for the end of the path.

4. The method as claimed in claim 1, wherein at least one of the candidate areas in the plurality of areas is a candidate intermediate area for the path, wherein the candidate intermediate area is adjacent to at least one other candidate area in the plurality of candidate areas.

5. The method as claimed in claim 1, wherein one or more of the area metrics or transition metrics are determined using the obtained set of at least one of measurements or parameters.

6. The method as claimed in claim 5, wherein an area metric for a first candidate area is determined by comparing the at least one of respective measurements or parameters for the first candidate area and another candidate area adjacent to the first candidate area.

7. The method as claimed in claim 5, wherein a transition metric for a pair of candidate areas is determined by comparing the at least one of respective measurements or parameters for the candidate areas in the pair.

8. The method as claimed in claim 1, wherein at least one of the area metrics or transition metrics are determined using information relating to at least one of a road network or a rail network in the plurality of areas.

9. The method as claimed in claim 8, wherein the information relating to the road network comprises information indicating at least one of road infrastructure or road traffic or utilisation.

10. The method as claimed in claim 1, wherein the transition metric for the pair of candidate areas is determined based on a distance between the pair of candidate areas.

11. The method as claimed in claim 1, wherein the pairs of candidate areas comprise candidate areas that are adjacent to each other, or are within a predetermined distance of each other.

12. The method as claimed in claim 1, wherein a path metric indicates a likelihood that the terminal device traversed the respective candidate path.

13. The method as claimed in claim 1, wherein the set of at least one of measurements or parameters comprise timing information indicating when the at least one of measurements were made or timing information indicating when the parameters were applicable.

14. The method as claimed in claim 1, wherein the set of at least one of measurements or parameters comprise at least one of:
   signal quality measurements by the at least one of the terminal device or the communication network;
   channel quality measurements by the at least one of the terminal device or the communication network;
   a timing advance;
   an identifier of one or more cells of the communication network serving the terminal device; and
   channel state information (CSI) for one or more channels between the terminal device and the communication network.

15. The method as claimed in claim 1, wherein the method further comprises:
   partitioning a geographical region served by the communication network into the plurality of areas.

16. The method as claimed in claim 1, wherein the areas in the plurality of areas are non-overlapping.

17. The method as claimed in claim 1, wherein at least two areas in the plurality of areas partially overlap.

18. The method as claimed in claim 1, wherein the method further comprises:
   identifying the area in the determined path in which the terminal device was located when a first measurement was obtained based on a timing of the first measurement.

19. The method as claimed in claim 18, wherein the method further comprises:
   associating the first measurement with the identified area in a training data set; and
   using the training data set to train a machine learning model.

20. An apparatus configured to determine a path of movement of a terminal device, the apparatus configured to:
   obtain a set of at least one of measurements or parameters relating to at least one of the terminal device or a communication network in which the terminal device is operating, wherein the at least one of respective measurements or respective parameters in the received set were obtained as the terminal device traversed a path of movement through a plurality of areas;

use the obtained set of the at least one of measurements or parameters to identify a plurality of candidate areas in which the terminal device have been located as the terminal device traversed the path of movement, wherein one or more of the plurality of candidate areas has an associated area metric indicating a likelihood that the terminal device was in the candidate area as the terminal device traversed the path of movement;

use the obtained set of the at least one of measurements or parameters to determine respective transition metrics for pairs of the candidate areas, wherein a transition metric for a pair of candidate areas indicates a likelihood that the terminal device-moved from a first candidate area in the pair to the other candidate area in the pair;

determine respective path metrics for a plurality of candidate paths, wherein a candidate path comprises a series of the candidate areas, and wherein the path metric for a candidate path is formed from a combination of the area metrics and transition metrics for the candidate areas in the candidate path; and determine the path of movement traversed by the terminal device according to the determined path metrics.

* * * * *